US012608200B2

(12) United States Patent
Zhou et al.

(10) Patent No.: US 12,608,200 B2
(45) Date of Patent: Apr. 21, 2026

(54) COMPUTING CHIP AND INSTRUCTION PROCESSING METHOD TO ACCESS SOURCE OPERANDS IN PRIVATE REGISTERS USING A RELATIVE DISTANCE INDEX

(71) Applicant: HUAWEI TECHNOLOGIES CO., LTD., Shenzhen (CN)

(72) Inventors: Ruoyu Zhou, Shenzhen (CN); Wenbo Sun, Hangzhou (CN); Jianjiang Zeng, Shanghai (CN); Guozhu Li, Shenzhen (CN); Xiping Zhou, Shenzhen (CN); Heng Liao, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 18/741,186

(22) Filed: Jun. 12, 2024

(65) Prior Publication Data

US 2024/0419443 A1     Dec. 19, 2024

(30) Foreign Application Priority Data

Jun. 15, 2023     (CN) .......................... 202310717395.6

(51) Int. Cl.
| *G06F 9/30* | (2018.01) |
| *G06F 9/26* | (2006.01) |
| *G06F 9/38* | (2018.01) |

(52) U.S. Cl.
CPC .............. G06F 9/261 (2013.01); G06F 9/264 (2013.01)

(58) Field of Classification Search
CPC ............... G06F 9/30116; G06F 9/3016; G06F 9/30138; G06F 9/30123; G06F 9/3824
See application file for complete search history.

(56) References Cited

U.S. PATENT DOCUMENTS

| 8,655,638 B2 | 2/2014 | Stadel | |
| 9,513,921 B2 * | 12/2016 | Godard | ............... G06F 13/4068 |

(Continued)

FOREIGN PATENT DOCUMENTS

WO     2020263445 A1     12/2020

OTHER PUBLICATIONS

Extended European Search Report in European Appln. No. 24181561.2, mailed on Jan. 2, 2025, 9 pages.

(Continued)

*Primary Examiner* — Jacob Petranek
(74) *Attorney, Agent, or Firm* — Fish & Richardson P.C.

(57)     ABSTRACT

Embodiments of this application provide example computing chips and instruction processing method related to the field of integrated circuit technologies. One example computing chip uses a superscalar processor architecture, and includes an instruction processing unit and a plurality of registers that are separately coupled to the instruction processing unit. The plurality of registers include a general purpose register and a plurality of private registers that are separately coupled to the general purpose register. The general purpose register is configured to store an execution result of a microinstruction that is in a plurality of microinstructions of a computing task and that is executed before a jump instruction and whose execution result is referenced by a microinstruction that is executed after the jump instruction. Each private register in the plurality of private registers is configured to store an execution result of any microinstruction in the plurality of microinstructions.

19 Claims, 10 Drawing Sheets

(56) References Cited

U.S. PATENT DOCUMENTS

| | | | | |
|---|---|---|---|---|
| 9,600,288 | B1 * | 3/2017 | Potter | .................. G06F 9/3824 |
| 2015/0058571 | A1 * | 2/2015 | Potter | ..................... G06F 9/383 |
| | | | | 711/125 |
| 2018/0341488 | A1 * | 11/2018 | Burger | ............... G06F 9/30047 |
| 2020/0409712 | A1 * | 12/2020 | Clancy | ................. G06F 9/3858 |

OTHER PUBLICATIONS

Onder et al., "SINAN: An Argument Forwarding Multithreaded Architecture," International Conference on High Performance Computing, 1999, 8 pages.
Irie et al., "STRAIGHT: Hazardless Processor Architecture Without Register Renaming," 2018 51st Annual IEEE/ACM International Symposium on Microarchitecture (MICRO), Oct. 20, 2018, 13 pages.

* cited by examiner

Inst: Instruction; PC: Program counter; opc: Opcode; dec data: Decoded data; rd/wt: Read/Write back; stall/flush: Stall/Flush; opc/data: Opcode/Operand; rslt: Execution result; Date: Data; get/set: Get/Set; gpr_id: General purpose register identifier; set_date: Set data

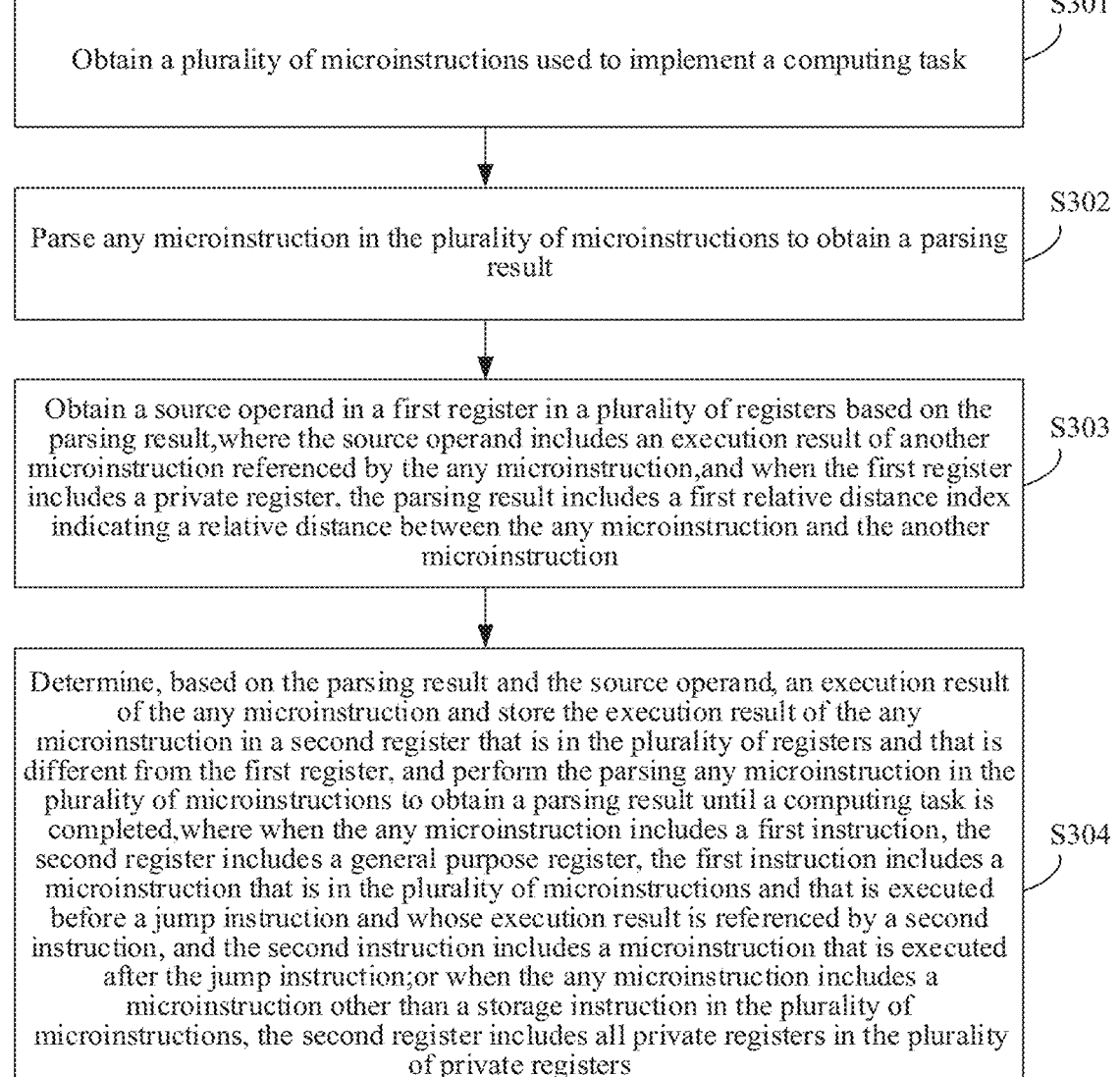

Obtain a plurality of microinstructions used to implement a computing task       S301

Parse any microinstruction in the plurality of microinstructions to obtain a parsing result       S302

Obtain a source operand in a first register in a plurality of registers based on the parsing result, where the source operand includes an execution result of another microinstruction referenced by the any microinstruction, and when the first register includes a private register, the parsing result includes a first relative distance index indicating a relative distance between the any microinstruction and the another microinstruction       S303

Determine, based on the parsing result and the source operand, an execution result of the any microinstruction and store the execution result of the any microinstruction in a second register that is in the plurality of registers and that is different from the first register, and perform the parsing any microinstruction in the plurality of microinstructions to obtain a parsing result until a computing task is completed, where when the any microinstruction includes a first instruction, the second register includes a general purpose register, the first instruction includes a microinstruction that is in the plurality of microinstructions and that is executed before a jump instruction and whose execution result is referenced by a second instruction, and the second instruction includes a microinstruction that is executed after the jump instruction; or when the any microinstruction includes a microinstruction other than a storage instruction in the plurality of microinstructions, the second register includes all private registers in the plurality of private registers       S304

FIG. 3

Inst: Instruction; PC: Program counter; opc : Opcode; dec data: Decoded data; rd/wt: Read/Write back; stall/flush: Stall/Flush; opc/data: Opcode/Operand; rslt : Execution result; date: Data; get/set: Get/Set; gpr_id: General purpose register identifier; set_date: Set data

COMPUTING CHIP AND INSTRUCTION PROCESSING METHOD TO ACCESS SOURCE OPERANDS IN PRIVATE REGISTERS USING A RELATIVE DISTANCE INDEX

CROSS-REFERENCE TO RELATED APPLICATION

This application claims priority to Chinese Patent Application No. 202310717395.6, filed on Jun. 15, 2023, which is hereby incorporated by reference in its entirety.

TECHNICAL FIELD

Embodiments of this application relate to the field of integrated circuit technologies, and in particular, to a computing chip and an instruction processing method.

BACKGROUND

Generally, a computing chip such as a single-core central processing unit (CPU) may improve CPU performance by improving a degree of parallelism between instructions at an architecture layer of instruction processing. For example, a processor that uses a superscalar processor architecture executes instructions out of order to improve the degree of parallelism between the instructions. Specifically, the processor predicts at least one instruction that can be executed after an instruction that is currently executed, to execute the instruction obtained through prediction in advance. In this way, there is no need to wait, according to an instruction sequence in a computing task, for execution of previous instructions to be completed before executing subsequent instructions, thereby greatly improving the degree of parallelism between the instructions.

In a related technology, different instructions in a same computing task may use a same register. In this way, out-of-order execution of the instructions easily causes a read/write conflict on the same register. A processor may resolve the read/write conflict by renaming the register. For example, the renaming of the register may include: selecting one instruction in a plurality of instructions related to the read/write conflict of the register to still use the register, naming, for at least one instruction other than the one instruction in the plurality of instructions, at least one register that has no read/write conflict and that is in a one-to-one correspondence with the at least one instruction, and establishing a mapping relationship between a new register name and a corresponding instruction.

However, in a case of renaming the register, establishing the mapping relationship between the new register name and the corresponding instruction is time-consuming. In addition, a physical register needs to be added in the processor to facilitate the renaming, which very probably reduces processor performance. In other words, the manner of renaming the register very probably reduces instruction processing efficiency of the processor.

SUMMARY

To resolve the foregoing technical problem, this application provides a computing chip and an instruction processing method. In the instruction processing method, based on a relative distance between microinstructions and a source operand referenced by a private register, renaming a register is avoided. On this basis, accurate data reference is ensured using a general purpose registers when a jump instruction causes a change of a relative distance between instructions, thereby improving instruction processing efficiency of a processor.

According to a first aspect, an embodiment of this application provides a computing chip. The computing chip uses a superscalar processor architecture and includes a plurality of registers and an instruction processing unit. The plurality of registers are separately coupled to the instruction processing unit. The plurality of registers include a general purpose register and a plurality of private registers that are separately coupled to the general purpose register. The general purpose register is configured to store an execution result that is of a first instruction and that is referenced by a second instruction, where the first instruction includes a microinstruction that is executed before a jump instruction in a plurality of microinstructions used to implement a computing task; and the second instruction includes a microinstruction executed after the jump instruction. Each private register in the plurality of private registers is configured to store an execution result of a microinstruction other than a storage instruction in the plurality of microinstructions. The instruction processing unit is configured to: parse any microinstruction in the plurality of microinstructions, obtain a source operand in a first register in the plurality of registers based on a parsing result to determine an execution result of the any microinstruction and store the execution result of the any microinstruction in a second register that is in the plurality of registers and that is different from the first register, and perform the parsing any microinstruction in the plurality of microinstructions until a computing task is completed. The source operand includes an execution result of another microinstruction referenced by the any microinstruction, and when the source operand includes an execution result in the private register, the parsing result includes a relative distance index indicating a relative distance between the any microinstruction and the another microinstruction.

In this embodiment of this application, an execution result of a microinstruction other than a write instruction is stored in a private register. When no jump instruction is encountered, it can be ensured that a microinstruction directly references a source operand, that is, an execution result of another microinstruction, based on a relative distance between the microinstruction and the another microinstruction. As a result, a relative distance difference between different microinstructions can be used to avoid register renaming caused when a register is specially named for the reference of the source operand. When a jump instruction is encountered, the execution result of the another microinstruction is stored in the general purpose register and a source operand in the general purpose register is obtained, so that the microinstruction references the source operand before the jump instruction, thereby avoiding a source operand reference error caused by a change of a relative distance between instructions caused by the jump instruction when the source operand is directly referenced based on the relative distance between microinstructions. In this way, efficiency reduction caused by a register renaming operation in out-of-order instruction execution and a search for a mapping between an instruction and a register in the register renaming operation can be avoided, and an additionally added physical register is avoided, thereby improving instruction processing efficiency of the processor.

According to the first aspect, the instruction processing unit is specifically configured to: obtain one microinstruction in the plurality of microinstructions, and parse the one microinstruction to obtain a parsing result, where the parsing result includes a location obtaining identifier, or the relative distance index and a second register identifier, and the location obtaining identifier includes a first register identifier or the relative distance index; obtain the source operand from a first private register indicated by the relative distance index or a first general purpose register indicated by the first register identifier; execute the any microinstruction based on the source operand obtained from the first private register, to obtain the execution result of the any microinstruction, and store the execution result of the any microinstruction in a second private register that is in the plurality of private registers and that is allocated to the any microinstruction; when the parsing result includes the second register identifier, store the source operand obtained from the first private register in a second general purpose register indicated by the second register identifier; store the source operand obtained from the first general purpose register in an idle private register in the plurality of private registers; and perform the obtaining one microinstruction in the plurality of microinstructions until the computing task is completed.

In this embodiment of this application, the instruction processing unit parses the microinstruction to obtain the relative distance index or the first register identifier that indicates a storage location of the source operand, and in one case, a second register identifier that indicates a storage location of the execution result may be further obtained, so that the microinstruction is executed based on the parsing result without renaming any register, thereby improving the instruction processing efficiency.

According to the first aspect or any one of the foregoing implementations of the first aspect, the instruction processing unit is further configured to: after determining the execution result of the any microinstruction, submit the any microinstruction, so that the computing chip executes the computing task based on the execution result of the any microinstruction; and before storing the execution result of the any microinstruction in the register: if a preset quantity of microinstructions before the any microinstruction are all submitted, update, to an idle state, a private register occupied by a microinstruction that is in the preset quantity of microinstructions and that has a longest relative distance from the any microinstruction; or if the any microinstruction is a jump instruction, update, to an idle state, a private register occupied by instruction in a preset quantity of microinstructions before the jump instruction, where the preset quantity is an integer greater than or equal to 1. The instruction processing unit is specifically configured to store the execution result of the any microinstruction in an idle register based on the parsing result.

In this embodiment of this application, the register may be released, that is, may be updated to an idle state, based on submission of the microinstruction, to achieve an effect of an infinite quantity of private registers, thereby further improving the instruction processing efficiency and reducing hardware costs of the computing chip.

According to the first aspect or any one of the foregoing implementations of the first aspect, the preset quantity is equal to a quantity of the plurality of private registers.

In this embodiment of this application, an instruction window may be adaptively extended based on a quantity of registers, thereby improving register utilization and extending an instruction-level parallel processing capability.

According to the first aspect or any one of the foregoing implementations of the first aspect, the instruction processing unit is specifically configured to: create at least one thread used to execute the computing task, and allocate at least two private registers in the plurality of private registers to each thread in the at least one thread, where each thread is configured to process at least one microinstruction in the plurality of microinstructions, and perform the parsing any microinstruction in the plurality of microinstructions on the any microinstruction in the at least one microinstruction through each thread.

In this embodiment of this application, the instruction processing unit can implement instruction processing of a plurality of threads by allocating the plurality of private registers, thereby further improving the instruction processing efficiency.

According to the first aspect or any one of the foregoing implementations of the first aspect, the instruction processing unit is specifically configured to: obtain any microinstruction in the plurality of microinstructions through prediction according to an out-of-order processing rule of the superscalar processor architecture, and perform the parsing any microinstruction in the plurality of microinstructions to obtain a parsing result; and when the prediction is incorrect, update a register occupied by the any microinstruction that is incorrectly predicted to an idle state, and re-perform the obtaining any microinstruction in the plurality of microinstructions through prediction.

In this embodiment of this application, if an instruction prediction is incorrect, only a private register needs to be refreshed, and a mapping relationship does not need to be searched for to restore the register to a state before a predicted instruction is used. Hardware with lower complexity is used to implement a simpler out-of-order execution pipeline, and a restoration speed of instruction processing when a prediction misses is accelerated.

According to the first aspect or any one of the foregoing implementations of the first aspect, the instruction processing unit includes an instruction caching module, an instruction fetching module coupled to the instruction caching module, a decoding module coupled to the instruction fetching module, and an execution module separately coupled to the plurality of private registers, where the decoding module is separately coupled to the plurality of private registers. The instruction caching module is configured to store the plurality of microinstructions; the instruction fetching module is configured to: obtain one microinstruction in the instruction caching module, to obtain any microinstruction in the plurality of microinstructions, and transfer the any microinstruction in the plurality of microinstructions to the decoding module until the computing task is completed; the decoding module is configured to: parse the any microinstruction in the plurality of microinstructions, obtain the source operand in the first register in the plurality of registers based on a parsing result, and send the source operand and the parsing result to the execution module; and the execution module is configured to: determine the execution result of the any microinstruction based on the source operand and the parsing result, and store the execution result of the any microinstruction in the second register that is in the plurality of registers and that is different from the first register.

In this embodiment of this application, instruction processing based on the relative distance index, the private register, and the general purpose register is implemented through the instruction caching module, the instruction fetching module, the decoding module, and the execution module in the instruction processing unit. There is no need to rename the register, and the instruction processing efficiency can be improved.

According to a second aspect, an embodiment of this application provides an instruction processing method applied to a computing chip using a superscalar processor architecture, where the computing chip includes a plurality of registers, and the plurality of registers include a general purpose register and a plurality of private registers. The method includes: obtaining a plurality of microinstructions used to implement a computing task; parsing any microinstruction in the plurality of microinstructions to obtain a parsing result; obtaining a source operand in a first register in the plurality of registers based on the parsing result, where the source operand includes an execution result of another microinstruction referenced by the any microinstruction, and when the first register includes the private register, the parsing result includes a relative distance index indicating a relative distance between the any microinstruction and the another microinstruction; determining, based on the parsing result and the source operand, an execution result of the any microinstruction and storing the execution result of the any microinstruction in a second register that is in the plurality of registers and that is different from the first register, and performing the parsing any microinstruction in the plurality of microinstructions to obtain a parsing result until the computing task is completed. When the any microinstruction includes a first instruction, the second register includes the general purpose register, the first instruction includes a microinstruction that is in the plurality of microinstructions and that is executed before a jump instruction and whose execution result is referenced by the second instruction, and the second instruction includes a microinstruction that is executed after the jump instruction; or when the any microinstruction includes a microinstruction other than a storage instruction in the plurality of microinstructions, the second register includes any private register in the plurality of private registers.

According to the second aspect, the parsing any microinstruction in the plurality of microinstructions to obtain a parsing result includes: obtaining one microinstruction in the plurality of microinstructions, and parsing the one microinstruction to obtain a parsing result, where the parsing result includes a location obtaining identifier, or a relative distance index and a second register identifier, and the location obtaining identifier includes a first register identifier or a relative distance index; the obtaining a source operand in a first register in the plurality of registers based on the parsing result includes: obtaining the source operand from a first private register indicated by the relative distance index or a first general purpose register indicated by the first register identifier; and the determining, based on the parsing result and the source operand, an execution result of the any microinstruction, storing the execution result of the any microinstruction in a second register that is in the plurality of registers and that is different from the first register, and performing the parsing any microinstruction in the plurality of microinstructions to obtain a parsing result until the computing task is completed includes: executing the any microinstruction based on the source operand obtained from the first private register, to obtain the execution result of the any microinstruction, and storing the execution result of the any microinstruction in a second private register that is in the plurality of private registers and that is allocated to the any microinstruction; when the parsing result includes the second register identifier, storing the source operand obtained from the first private register in a second general purpose register indicated by the second register identifier; storing the source operand obtained from the first general purpose register in an idle private register in the plurality of private registers; and performing the obtaining one microinstruction in the plurality of microinstructions until the computing task is completed.

According to the second aspect or any one of the foregoing implementations of the second aspect, after the determining an execution result of the any microinstruction, the method further includes: submitting the any microinstruction for the method to execute the computing task based on the execution result of the any microinstruction; before storing the execution result of the any microinstruction in a register, the method further includes: if a preset quantity of microinstructions before the any microinstruction are all submitted, updating, to an idle state, a private register occupied by a microinstruction that is in the preset quantity of microinstructions and that has a longest relative distance from the any microinstruction; or if any microinstruction is a jump instruction, updating, to an idle state, a private register occupied by instruction in a preset quantity of microinstructions before the jump instruction; where the preset quantity is an integer greater than or equal to 1; and storing the execution result of the any microinstruction in a second register that is in the plurality of registers and that is different from the first register includes: storing the execution result of the any microinstruction in an idle register based on the parsing result.

According to the second aspect or any one of the foregoing implementations of the second aspect, the preset quantity is equal to a quantity of the plurality of private registers.

According to the second aspect or any one of the foregoing implementations of the second aspect, the parsing any microinstruction in the plurality of microinstructions to obtain a parsing result includes: creating at least one thread used to execute the computing task, and allocating at least two private registers in the plurality of private registers to each thread in the at least one thread, where each thread is configured to process at least one microinstruction in the plurality of microinstructions; and performing the parsing any microinstruction in the plurality of microinstructions on the any microinstruction in the at least one microinstruction through each thread.

According to the second aspect or any one of the foregoing implementations of the second aspect, the parsing any microinstruction in the plurality of microinstructions to obtain a parsing result includes: obtaining any microinstruction in the plurality of microinstructions through prediction according to an out-of-order processing rule of the superscalar processor architecture, and performing the parsing any microinstruction in the plurality of microinstructions to obtain a parsing result; and when the prediction is incorrect, updating a register occupied by the any microinstruction that is incorrectly predicted to an idle state, and re-performing the obtaining any microinstruction in the plurality of microinstructions through prediction.

The second aspect and any one of the implementations of the second aspect respectively correspond to the first aspect and any one of the implementations of the first aspect. For technical effects corresponding to the second aspect and any one of the implementations of the second aspect, refer to technical effects corresponding to the first aspect and any one of the implementations of the first aspect. Details are not described herein again.

According to a third aspect, an embodiment of this application provides an electronic device, including a processor, a transceiver; and a memory, configured to store one or more programs; and when the one or more programs are executed by one or more processors, the one or more processors are enabled to implement any method according to the second aspect and any one of the implementations of the second aspect.

According to a fourth aspect, an embodiment of this application provides a computer-readable medium, configured to store a computer program, where the computer program includes instructions used to perform the method in the second aspect or any one of the possible implementations of the second aspect.

According to a fifth aspect, an embodiment of this application provides a computer program, where the computer program includes instructions used to perform the method in the second aspect or any one of the possible implementations of the second aspect.

BRIEF DESCRIPTION OF DRAWINGS

To describe the technical solutions in embodiments of this application more clearly, the following briefly introduces the accompanying drawings required for describing embodiments of this application. It is clear that the accompanying drawings in the following descriptions show merely some embodiments of this application, and a person of ordinary skill in the art may still derive other drawings from these accompanying drawings without creative efforts.

FIG. 3 is a schematic flowchart of an instruction processing method according to an embodiment of this application;

DESCRIPTION OF EMBODIMENTS

Figure 1:
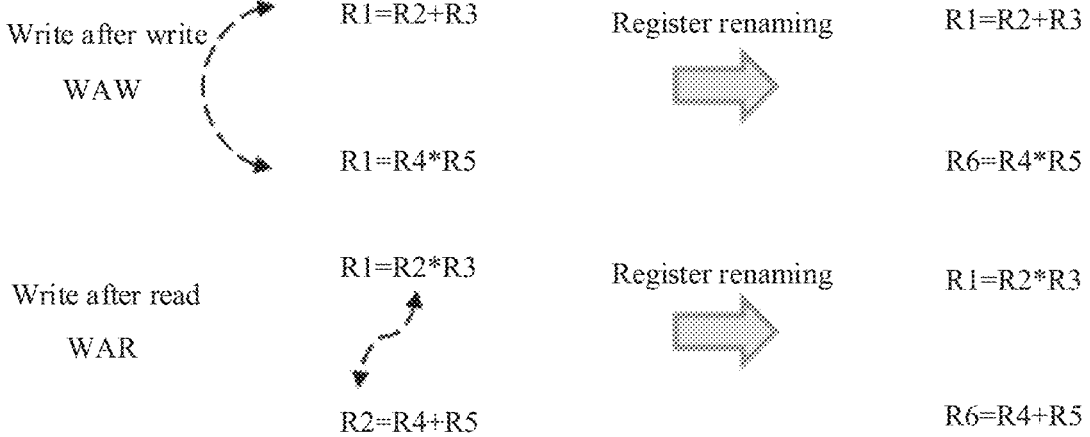
FIG. 1 is an example of a schematic diagram of a register read/write conflict.

The following clearly describes the technical solutions in embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and the like are intended to distinguish between different objects but do not indicate a particular order of the objects. For example, a first target object, a second target object, and the like are used for distinguishing between different target objects, but are not used for describing a specific order of the target objects.

In addition, in embodiments of this application, the word "exemplary" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In the descriptions of embodiments of this application, unless otherwise stated, "a plurality of" means two or more than two. For example, a plurality of processing units are two or more processing units, and a plurality of systems are two or more systems.

For ease of understanding this embodiment, some technical terms and background technologies in this embodiment are first described.

Superscalar CPU: A superscalar CPU is a processor that uses a superscalar processor architecture, that is, a CPU, namely, a superscalar processor, that runs a plurality of instructions at the same time to improve running efficiency and utilization of computing resources in the CPU. For example, the CPU decomposes a computing task into a form of a plurality of instructions for execution on different threads, and each thread independently uses different computing resources in the CPU, thereby improving the utilization of the computing resources in the CPU. For each thread, before execution of the thread is completed, a thread to be executed next may be predicted. In other words, the instructions in the superscalar CPU are not executed in sequence according to an order of the instructions in the computing task, but are executed out of order. When execution of a current instruction is not completed, an instruction to be executed later may be predicted and scheduled, and then be executed. In this way, if the prediction is correct, the instruction to be executed later does not need to wait for execution for a long time, and an execution result can be directly used, thereby improving instruction running efficiency. If the prediction is incorrect, an execution result of the predicted instruction to be executed later can only be discarded, and a correct instruction to be executed later needs to be re-predicted from the instruction that is incorrectly predicted.

Microinstruction: In a CPU cycle of a computer, a combination of a group of micro-commands that implement specific operation functions is a microinstruction. Micro-commands are various control commands sent by a control component to an execution component through a control line, and are instructions in a minimum unit.

Register: A register is some small storage areas used to store data in a CPU and is used to temporarily store data and a calculation result involved in the calculation. In fact, a register is a common sequential logic circuit, but this sequential logic circuit includes only a storage circuit.

Register file: A register file is an array of a plurality of registers in the CPU, and is used to temporarily store data between a memory and a CPU computing component. The register file is usually implemented by using a fast static random access memory (SRAM), and has a dedicated read port and write port, so that different registers can be accessed concurrently through a plurality of channels.

General purpose register (GPR): A general purpose register is a register included in a fixed register set of a processor architecture, and is also referred to as an architecture register. The fixed register set may include a general purpose register, a dedicated register, and a program counter.

Instruction counter (PC): An instruction counter is an address used to store an instruction, and is also referred to as a program counter. A PC value is the address of the instruction.

Commit: The last stage that is usually added to instruction processing of a superscalar processor is referred to as a commit stage, namely, the commit stage, to ensure that the processor correctly executes programs according to a serial sequence of the programs. That an instruction reaches the commit stage may include: marking the instruction as a completed state, and updating, when execution of an instruction before the instruction in the serial sequence of the programs is completed, an internal state of the processor by using an execution result of the instruction (for example, write back: updating content corresponding to the instruction in a main memory of the processor by using the execution result of the instruction). In this case, it is referred to as that the instruction retires, that is, the instruction may be removed from an instruction processing pipeline. The internal state of the processor may include a speculative state and an architecture state. The speculative state is a state that is of a component in the superscalar processor in a running process and that corresponds to the execution result of the predicted instruction, for example, values of components such as a reordering buffer, a transmit queue, and a store buffer. The architecture state means values of components such as a general purpose register, a PC, and a memory defined in an instruction set of the superscalar processor. Due to out-of-order execution, the speculative state is ahead of the state defined by the instruction set, namely, the architecture state.

Thread: A thread is a minimum unit for an operating system to perform computing and scheduling. The thread is included in a process and is an actual operating unit of the process. One thread is a single sequential control flow in a process. A plurality of threads can be concurrently executed in one process, and each thread executes different tasks in parallel.

Program counter (PC): A program counter is also referred to as an instruction counter, and is an address used to store an instruction. A value in the program counter PC indicates a location of a current instruction in a main memory. After an instruction is taken out, the value in the PC automatically increases based on an instruction word length. For example, an address of a single-word length instruction is (PC)+1àPC, an address of a dual-word length instruction is (PC)+2àPC, and so on.

Instruction fetch (IF): Instruction fetch is fetching an instruction, and is a process in which a CPU reads an instruction from a main memory (a memory of the CPU) and stores the instruction in an instruction register. The value in the program counter (PC) indicates a storage address of a to-be-executed instruction in the main memory in a current instruction execution cycle. After an instruction fetch operation ends, the PC points to an instruction to be read in a next cycle.

Out-of-order execution of the superscalar processor can fully exploit a potential benefit of instruction parallelism in a thread and improve expected performance. However, different instructions using the same register in the out-of-order execution introduces problems about write after write (WAW) and write after read (WAR). For example, FIG. 1 is an example of a schematic diagram of a register read/write conflict. As shown in FIG. 1:

The write-after-write problem means a problem of incorrect execution results of different instructions cause by a case in which the different instructions perform write operations on a same register, and different operation sequences cause different data in the register. For example, both an instruction 1 "R1=R2+R3" and an instruction 2 "R1=R4*R5" perform write operations on a register R1. As a result, R1 may be an execution result of R2+R3 or an execution result of R4*R5, causing a problem of an incorrect execution result of the instruction 1 or the instruction 2.

A read-after-write problem means a problem of an incorrect execution result of another instruction cause by a case in which an execution result of an instruction and a source operand of the another instruction use a same register, and different read and write sequences cause different data in the register. The source operand is an operand whose content in an instruction does not change with execution of the instruction. For example, an instruction 3 "R1=R2*R3" performs a read operation on a register R2, and an instruction 4 "R2=R4+R5" performs a write operation on the register R2. As a result, the register R2 may be an execution result of R4+R5. In this way, the instruction 3 may reference the execution result of R4+R5, or may reference data different from the execution result, causing a problem of an incorrect execution result of the instruction 3.

In an example, the WAW and WAR problems may be eliminated through register renaming. Still refer to FIG. 1. The register R1 used by the instruction 2 may be updated to a register R6 through register renaming, to avoid a data exception caused by the write operations performed by the instruction 1 and the instruction 2 on the same register. The register R2 used by the instruction 4 may be updated to the register R6 through register renaming, to avoid a data exception caused by the operations performed by the instruction 4 and the instruction 3 on the same register. However, a mapping relationship between a new register name and a corresponding instruction needs to be established during register renaming, which is time-consuming. In addition, a physical register needs to be added to a processor to implement the function, which increases hardware complexity. In this way, instruction processing efficiency of the processor may be very probably reduced.

Therefore, embodiments of this application provide a computing chip and an instruction processing method, to resolve the foregoing problems. For example, in the instruction processing method provided in embodiments of this application, an execution result of a microinstruction other than a write instruction is stored in a private register. When no jump instruction is encountered, it can be ensured that the microinstruction directly references a source operand, that is, an execution result of another microinstruction, based on a relative distance between the microinstruction and the another microinstruction, so that a relative distance difference between different microinstructions is used, thereby avoiding register renaming caused when a register is specially named for the reference of the source operand. When a jump instruction is encountered, the execution result of the another microinstruction is stored in a general purpose register and a source operand in the general purpose register is obtained, so that the microinstruction references the source operand before the jump instruction, thereby avoiding a source operand reference error caused by a change of a relative distance between instructions caused by the jump instruction when the source operand is directly referenced based on the relative distance between microinstructions. In this way, efficiency reduction caused by a register renaming operation in out-of-order instruction execution and a search for a mapping between an instruction and a register in the register renaming operation can be avoided, and an additionally added physical register is avoided, thereby improving instruction processing efficiency of the processor.

In other words, in embodiments of this application, it is equivalent to that the source operand is indicated by a relative distance index between microinstructions. The microinstruction may reference an execution result of a previous microinstruction. Correspondingly, a new instruction set and a compiler are designed, so that register renaming does not exist in an instruction processing pipeline. In this way, there is no need to record the mapping, and scalability of a reorder buffer (ROB) is improved correspondingly. The reorder buffer is a cache that is used to record an order of instructions in a program during out-of-order execution of the instructions to ensure that the instructions are submitted in order.

Embodiments of this application may be applied to a computing chip and an electronic device that runs the computing chip. The computing chip may be, for example, a superscalar CPU, and the electronic device may be, for example, a device such as a mobile terminal, a computer, a tablet computer, a wearable device, a server, or an Internet television that runs the computing chip. This is not limited in embodiments of this application.

Figure 2:
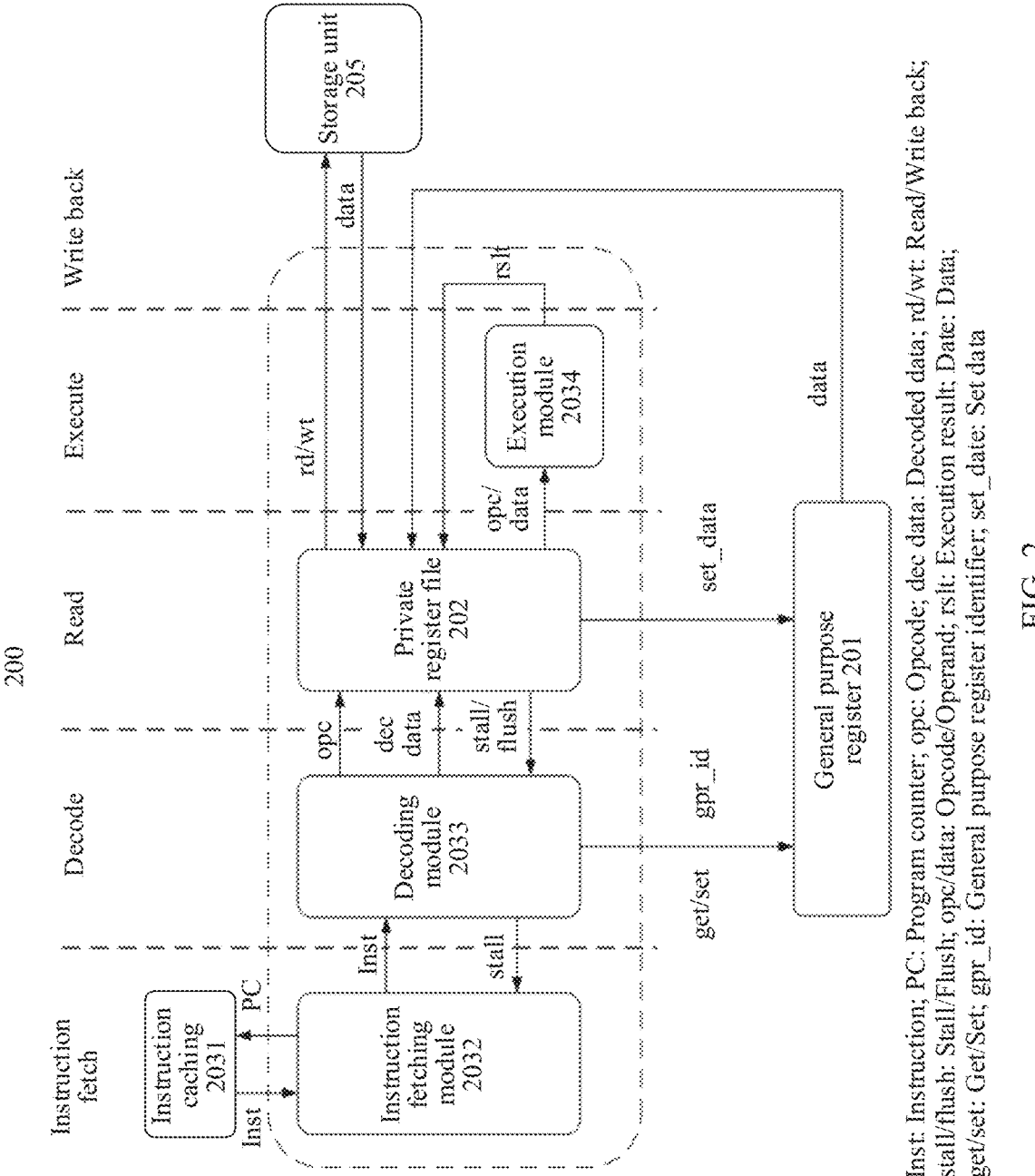
FIG. 2 is a block diagram of a structure of a computing chip 200 according to an embodiment of this application.

For example, FIG. 2 is a block diagram of a structure of a computing chip 200 according to an embodiment of this application. As shown in FIG. 2, the computing chip 200 uses a superscalar processor architecture, and may include a plurality of registers and an instruction processing unit. The plurality of registers are separately coupled to the instruction processing unit, and the plurality of registers may specifically include a general purpose register 201 and a plurality of private registers that are separately coupled to the general purpose register. The plurality of private registers may be, for example, a private register file 202. The instruction processing unit may include an instruction caching module 2031, an instruction fetching module 2032 coupled to the instruction caching module 2031, a decoding module 2033 coupled to the instruction fetching module 2032, and an execution module 2034 coupled to the private register file 202. The decoding module 2033 is separately coupled to the private register file 202 and the general purpose register 201. The foregoing coupling may be, for example, circuit connection, through-silicon-via (TSV) electrical connection, software interaction, or the like.

The general purpose register 201 is configured to store an execution result that is of a first instruction and that is referenced by a second instruction, where the first instruction includes a microinstruction that is executed before a jump instruction and that is in a plurality of microinstructions used to implement a computing task, and the second instruction includes a microinstruction that is executed after the jump instruction.

Each private register in the private register file 202 is configured to store an execution result of a microinstruction other than a write instruction in the plurality of microinstructions.

The instruction processing unit is configured to: parse any microinstruction in the plurality of microinstructions, obtain a source operand in a first register in the plurality of registers (for example, the private register file 202 and the general purpose register 201) based on a parsing result to determine an execution result of the any microinstruction and store the execution result of the any microinstruction in a second register that is in the plurality of registers (for example, the private register file 202) and that is different from the first register, and perform the parsing any microinstruction in the plurality of microinstructions until the computing task is completed.

The source operand includes an execution result of another microinstruction referenced by the any microinstruction. When the source operand includes an execution result in the private register, the parsing result includes a relative distance index indicating a relative distance between the any microinstruction and the another microinstruction.

For example, the instruction processing unit implements the foregoing instruction processing process through the modules included in the instruction processing unit:

The instruction caching module 2031 is configured to store the plurality of microinstructions.

The instruction fetching module 2032 is configured to: obtain one microinstruction in the instruction caching module 2031 to obtain any microinstruction in the plurality of microinstructions, and transfer the any microinstruction in the plurality of microinstructions to the decoding module 2033 until the computing task is completed.

The decoding module 2033 is configured to: parse the any microinstruction in the plurality of microinstructions, obtain, based on a parsing result, a source operand stored in a first register (for example, the private register file 202 and the general purpose register 201), and send the source operand and the parsing result to the execution module 2034.

The execution module 2034 is configured to: determine, based on the source operand and the parsing result, the execution result of the any microinstruction and store the execution result of the any microinstruction in the second register that is in a plurality of registers (for example, the private register file 202 and the general purpose register 201) and that is different from the first register.

It should be understood that both the first register and the second register may include a private register or a general purpose register, and a difference lies in that the first register and the second register are different registers. For example, when the first register is a private register T1, the second register is a private register T2 or R1, or when the first register is a general purpose register R1, the second register is a private register T1 or a general purpose register R2.

Still refer to FIG. 2. In an example, the computing chip 200 may further include a storage unit 205. The storage unit 205 may specifically include a load/store unit (LSU) and a cache unit. The load/store unit is configured to store data in a storage space, for example, a private register in the private register file 202, in response to read/write (rd/wt) of an instruction to data (for example, read a source operand in a form of an immediate operand/write back an execution result of an instruction). The cache unit may include an L1 cache: an instruction cache used to store an instruction and a data cache used to store data. The immediate operand is usually an operand given in an immediate addressing mode instruction. The operand provided in the immediate addressing mode follows an opcode and is placed in an instruction code segment together with the opcode.

For ease of understanding, with reference to FIG. 2 to FIG. 7, the following specifically describes a processor and an instruction processing process of the processor shown in FIG. 2.

FIG. 3 is a schematic flowchart of an instruction processing method according to an embodiment of this application. As shown in FIG. 3, the instruction processing method may be applied to the computing chip shown in FIG. 2 or an electronic device including the computing chip shown in FIG. 2, and may specifically include the following steps:

S301: Obtain a plurality of microinstructions used to implement a computing task.

As shown in FIG. 2, in a process of executing the computing task, the computing chip 200 may store, in response to an execution instruction of the computing task, the plurality of microinstructions used to implement the computing task in the instruction caching module 2031 (namely, ICACHE) to improve instruction processing efficiency. On this basis, the instruction fetching module 2032, for example, an instruction fetch unit (IFU), obtains one microinstruction (for example, Inst) in the instruction caching module 2031 based on an address of an instruction in a program counter, to obtain any microinstruction (for example, Inst), that is, a currently processed microinstruction, in the plurality of microinstructions, and transfers the any microinstruction (for example, Inst) in the plurality of microinstructions to the decoding module 2033, until the computing task is completed. For ease of description, a current instruction is subsequently used to represent the foregoing any microinstruction.

For example, the computing task may be, an image processing task, a file storage task, a video coding task, and the like. This is not limited in this embodiment of this application, and may be specifically set based on an application requirement.

S302: Parse the any microinstruction in the plurality of microinstructions to obtain a parsing result.

When receiving the any microinstruction sent by the instruction fetching module 2032, the decoding module 2033 may parse the any microinstruction, obtain, based on a parsing result, a source operand stored in a first register in a plurality of registers (for example, the private register file 202 and the general purpose register 201), and send the source operand and the parsing result to the execution module 2034.

For example, the parsing result may include an opcode (for example, "ADD" representing an adding operation), data (an operand, an obtaining location of the operand, and the like) obtained through decoding, an instruction type, and the like. The parsing result is used to obtain an operand and execute an operation indicated by a microinstruction. The instruction type may be classified according to an obtaining location of an operand, or may be classified according to a function of an instruction. This is not limited in this embodiment of this application.

In an example, the data obtained through decoding in the parsing result may specifically include three types:

The first type is a relative distance index. The relative distance index includes a relative distance between a current microinstruction and another microinstruction referenced by the current microinstruction, and the relative distance may be, for example, a difference between PC values of the instructions. For example, relative distance indexes in a parsing result of a microinstruction "ADD t#4, t#1" are t#4 and t#1 respectively representing the $4^{th}$ instruction and the $1^{st}$ instruction before the current instruction, that is, PC values whose differences from a PC value of the current instruction are 4 and 1 respectively; and a relative distance index in a parsing result of a microinstruction "LW [t#1, 0] is t#1. The relative distance index may indicate a register that stores an execution result of the another microinstruction referenced by the current microinstruction, that is, a storage location of the source operand.

The second type is a first register identifier. The first register identifier indicates a general purpose register that stores the source operand. For example, a first register identifier in a parsing result of a microinstruction "GET R3" is "R3".

The third type is a relative distance index and a second register identifier. The second register identifier indicates a general purpose register that stores an execution result. For example, a second register identifier in a parsing result of a microinstruction "SET R2, t#1" is "R2".

In this embodiment of this application, based on the relative distance between the instructions and private registers allocated to the instructions, specially naming a register for an execution result, that is, an output, of a microinstruction can be avoided. A problem caused by register renaming can be avoided by using a difference between relative distances between different instructions, and a quantity of encoding bits of code can be reduced, thereby further improving instruction processing efficiency and processor performance. For example, an instruction encoding format is shown in the following Table 1-1:

TABLE 1-1

| Instruction encoding format comparison | |
| --- | --- |
| Instruction encoding format provided in this embodiment of this application | Conventional instruction encoding format |
| GET R0 | ADD R2 R0 R1 |
| GET R1 | SLLI R3 R2 #2 |
| ADD t#1 t#2 | LD R4 [R3, R2] |
| SLLI t#1 #2 | |
| LD [t#1, t#2] | |

It can be learned that, in the encoding format in this embodiment of this application, naming a register for storing an output of an instruction is omitted. For example, the microinstruction in this embodiment of this application is "ADD t#1 t#2", and the microinstruction in the conventional encoding format is "ADD R2 R0 R1". In other words, in this embodiment of this application, the microinstruction may be described using two relative distance indexes t#1 and t#2 with reference to a PC value of the microinstruction. However, the conventional microinstruction is "ADD R2 R0 R1", and the microinstruction can be described only by naming three registers "R2, R0, and R1" that respectively represent two inputs and one output. In addition, in this embodiment of this application, the relative distance index can ensure that a quantity of encoding bits occupied by an instruction in the instruction encoding format provided in this embodiment of this application can be reduced to 16 bits compared with a quantity of encoding bits occupied by an instruction in the conventional instruction encoding format, and there is no 16-bit and 32-bit mixed encoding, thereby ensuring consistency of instruction lengths, greatly reducing hardware decoding complexity, and improving out-of-order execution efficiency. For example, a quantity of encoding bits corresponding to the foregoing instruction encoding format is shown in Table 1-2.

TABLE 1-2

Instruction encoding bits comparison

| Quantity of encoding bits occupied by each part in an instruction in the instruction encoding format provided in this embodiment of this application | Quantity of encoding bits occupied by each part in an instruction in the conventional instruction encoding format |
|---|---|
| Relative distance index 0 (Link 0): Bits 15 to 13 | Source operand 1 (Src1): Bits 31 to 27 |
| Relative distance index 1 (Link 1): Bits 12 to 10 | Source operand 0 (Src0): Bits 26 to 22 |
| Opcode (Opcode): Bits 9 to 0 | Destination operand (Dest): Bits 21 to 17 |
| | Opcode (Opcode): Bits 16 to 0 |

Figure 4:
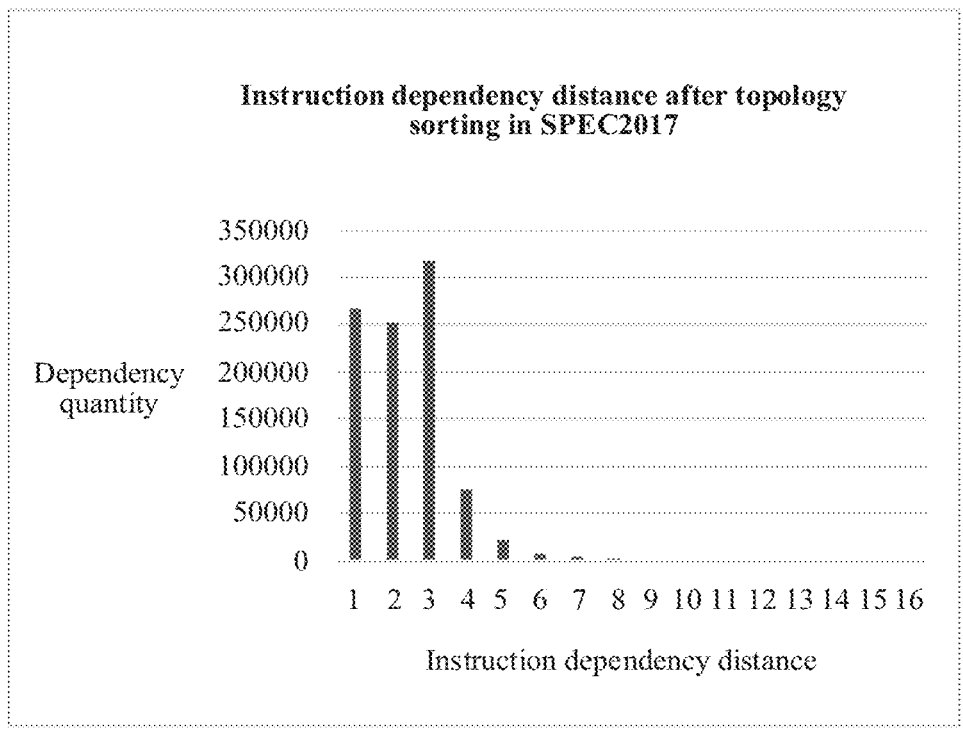
FIG. 4 is a schematic diagram of a relationship between an instruction dependency distance and a dependency quantity according to an embodiment of this application.

In an example, FIG. 4 is a schematic diagram of a relationship between an instruction dependency distance and a dependency quantity according to an embodiment of this application. As shown in FIG. 4, after topology sorting performed on the instruction dependency distance and the dependency quantity in the computing task in SPEC2017 (a CPU subsystem test tool), the following test result can be obtained: The instruction dependency distance is less than or equal to 8. In other words, any microinstruction in the computing task generally references an execution result of the eighth instruction at farthest before the microinstruction. Based on this, when the any microinstruction references eight previous microinstructions, an instruction encoding space has a greatest advantage, which can avoid unnecessary longer-distance indexing, and is more efficient and accurate. Therefore, in an example, a range of the relative distance index may be set to 8. For example, the tenth microinstruction may reference execution results of microinstructions 1 to 8, but cannot reference an execution result of a microinstruction 0.

For example, the relative distance index may include:

t#1: a difference between t#1 and the PC value of the current instruction, that is, a relative distance between the $1^{st}$ instruction before the current instruction and the current instruction, is 1;

t#2: a difference between t#2 and the PC value of the current instruction, that is, a relative distance between the $2^{nd}$ instruction before the current instruction and the current instruction, is 2;

t#3: a difference between t#3 and the PC value of the current instruction, that is, a relative distance between the $3^{rd}$ instruction before the current instruction and the current instruction, is 3;

t#4: a difference between t#4 and the PC value of the current instruction, that is, a relative distance between the $4^{th}$ instruction before the current instruction and the current instruction, is 4;

t#5: a difference between t#5 and the PC value of the current instruction, that is, a relative distance between the fifth instruction before the current instruction and the current instruction, is 5;

t#6: a difference between t#6 and the PC value of the current instruction, that is, a relative distance between the sixth instruction before the current instruction and the current instruction, is 6;

t#7: a difference between t#7 and the PC value of the current instruction, that is, a relative distance between the seventh instruction before the current instruction and the current instruction, is 7; and t#8: a difference between t#8 and the PC value of the current instruction, that is, a relative distance between the eighth instruction before the current instruction and the current instruction, is 8.

S303: Obtain the source operand in the first register in the plurality of registers based on the parsing result, where the source operand includes the execution result of the another microinstruction referenced by the any microinstruction, and when the first register includes the private register, the parsing result includes the relative distance index indicating the relative distance between the any microinstruction and the another microinstruction.

After obtaining the parsing result, the decoding module 2033 may obtain the source operand in the first register in the plurality of registers based on the parsing result. The first register may include a private register in the private register file 202, or the general purpose register 201.

For example, when the parsing result includes the relative distance index, the first register may include a private register. For example, the relative distance indexes in the parsing result of the microinstruction "ADD t#4, t#1" are t#4 and t#1, and respectively represent the PC values whose differences from the PC value of the current instruction are 4 and 1 respectively. Correspondingly, the first register may include two private registers, for example, a private register TR4 and a private register TR1, that store execution results of microinstructions whose differences between the PC values of the microinstructions and the PC value of the current instruction are 4 and 1 respectively. The relative distance index in the parsing result of the microinstruction "LW [t#1, 0]" is t#1. When the parsing result includes a first register identifier, the first register may include a general purpose register indicated by the first register identifier, for example, a general purpose register R3.

It may be understood that there may be a plurality of general purpose registers 201, and the general purpose register R3 is one of the plurality of general purpose registers 201.

After obtaining the source operand, the decoding module 2033 may separately send the source operand and the parsing result to the execution module 2034. As shown in FIG. 2, an opcode/operand (opc/data) is sent separately. In an example, the opcode and the operand may be sent together. This is not limited in this embodiment of this application, and may be set based on an application requirement.

S304: Determine, based on the parsing result and the source operand, an execution result of the any microinstruction and store the execution result of the any microinstruction in the second register that is in the plurality of registers and that is different from the first register, and perform the parsing any microinstruction in the plurality of microinstructions to obtain a parsing result until the computing task is completed, where when the any microinstruction includes a first instruction, the second register includes a general purpose register, the first instruction includes a microinstruction that is in the plurality of microinstructions and that is executed before the jump instruction and whose execution result is referenced by the second instruction, and the second instruction includes a microinstruction that is executed after the jump instruction; or when the any microinstruction includes a microinstruction other than a write instruction in the plurality of microinstructions, the second register includes any private register in the plurality of private registers.

After receiving the parsing result and the source operand sent by the decoding module 2033, the execution module

2034 may determine, based on the parsing result and the source operand, the execution result of the any microinstruction, and store the execution result of the any microinstruction in the second register that is in the plurality of registers (for example, the private register file 202 and the general purpose register 201) and that is different from the first register.

In an optional implementation, the execution module 2034 may perform the following operations:

obtaining the source operand from a first private register indicated by the relative distance index or a first general purpose register indicated by the first register identifier;

executing a microinstruction based on the source operand obtained from the first private register, to obtain the execution result of the any microinstruction, and storing the execution result of the any microinstruction in a second private register that is in the plurality of private registers and that is allocated to the any microinstruction;

when the parsing result includes the second register identifier, storing the source operand obtained from the first private register in a second general purpose register indicated by the second register identifier;

storing the source operand obtained from the first general purpose register into an idle private register in the plurality of private registers; and performing obtaining one microinstruction in the plurality of microinstructions until the computing task is completed.

Figure 5:
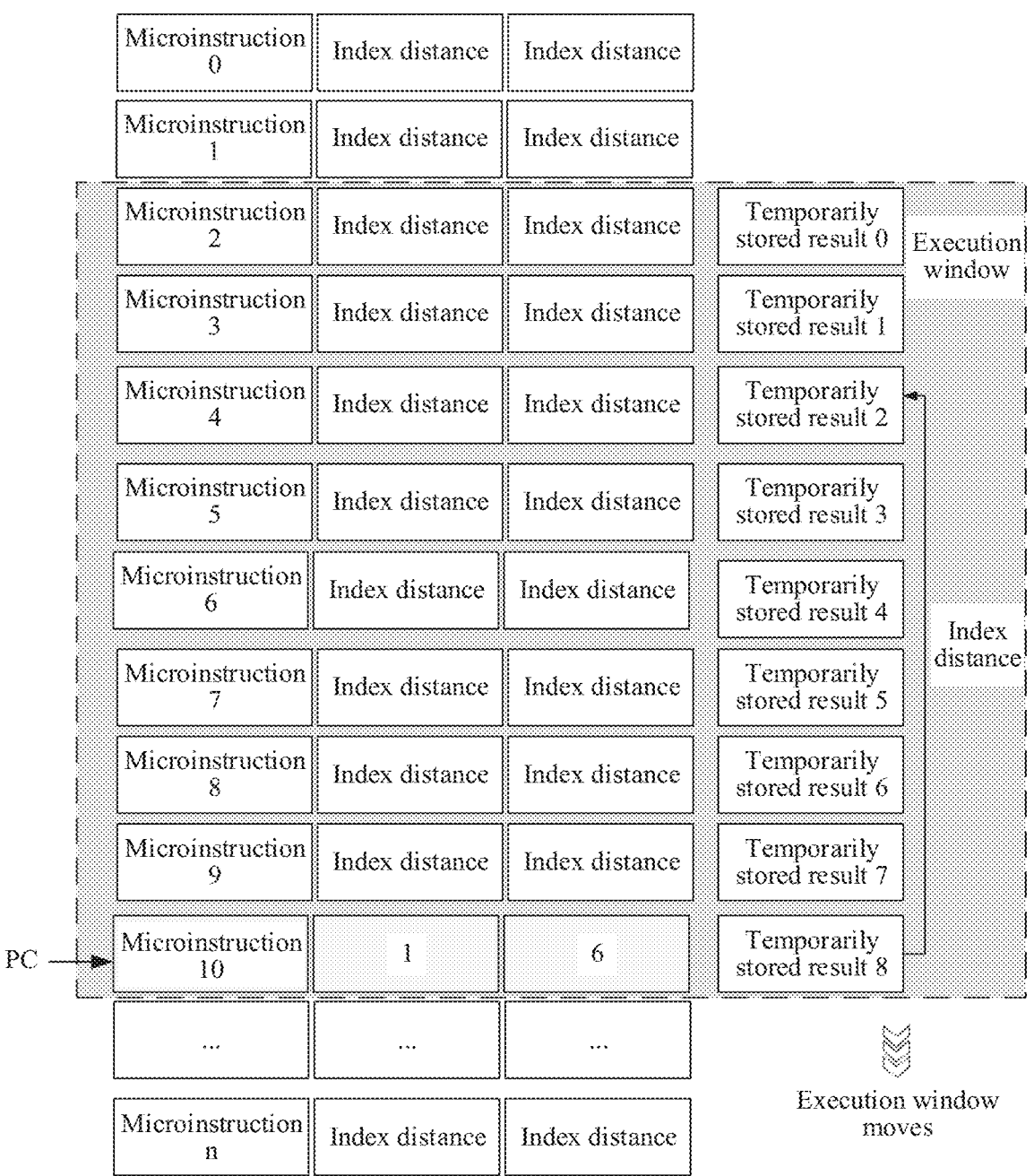
FIG. 5 is a schematic diagram of an instruction processing process in an instruction processing method according to an embodiment of this application.

For example, FIG. 5 is a schematic diagram of an instruction processing process in an instruction processing method according to an embodiment of this application. As shown in FIG. 5, the instruction fetching module 2032 obtains one microinstruction each time, to be specific, a microinstruction that is currently being executed and that is pointed to by the PC: a microinstruction 10. For example, the range of the relative distance index is less than or equal to 8. When an index distance of the microinstruction 10 is, that is, relative distance indexes are, "1" and "6", the microinstruction 10 references a temporarily stored result 7 of the 1$^{st}$ instruction, namely, a microinstruction 9, before the microinstruction 10, and a temporarily stored result 2 of the sixth instruction, namely, a microinstruction 4, before the microinstruction 10. In other words, a source operand of the microinstruction 10 is the temporarily stored result 7 and the temporarily stored result 2.

Figure 6:
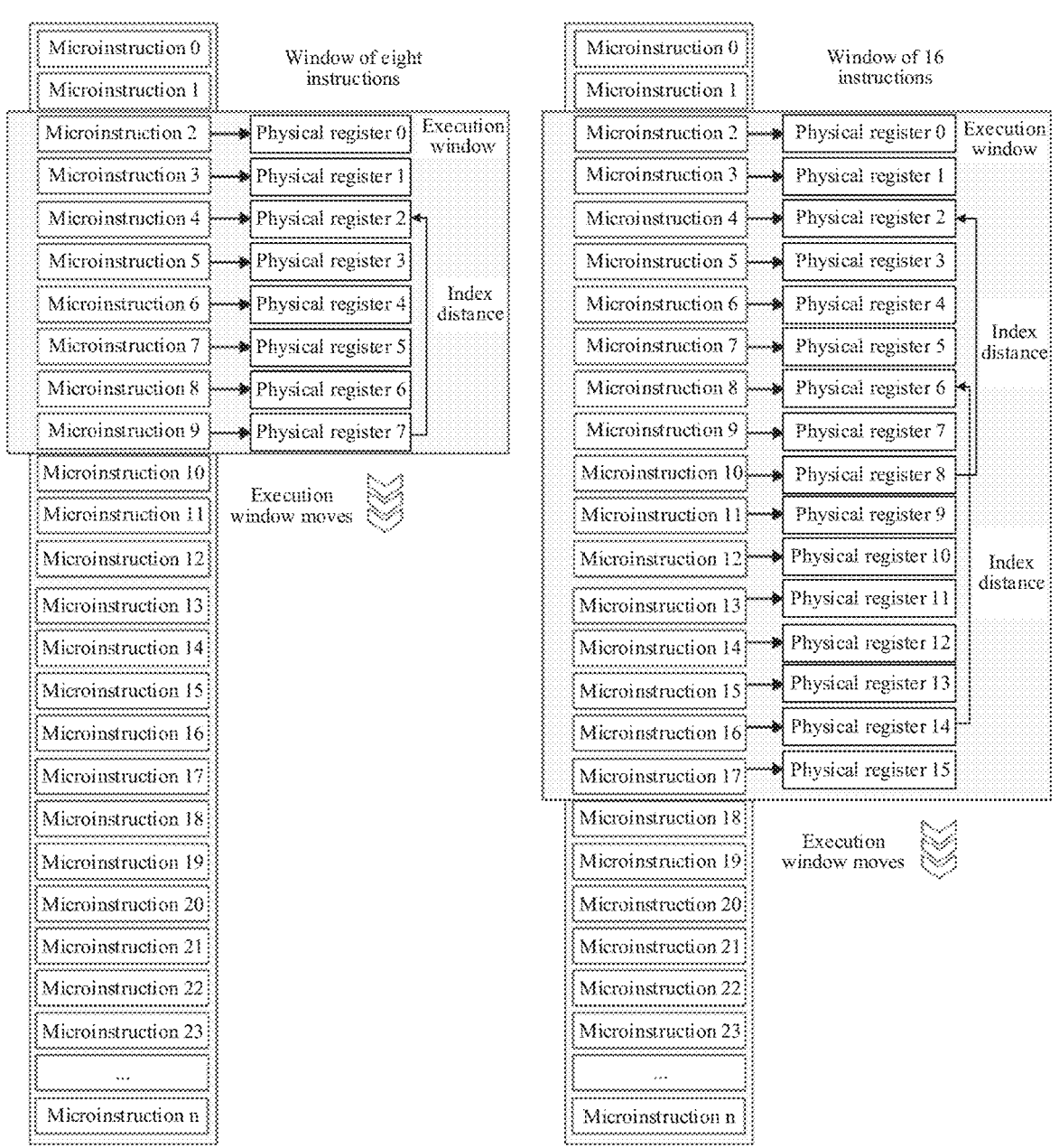
FIG. 6 is a schematic diagram of an instruction processing process in an instruction processing method according to an embodiment of this application.

When obtaining an execution result of the microinstruction 10, the execution module 2034 may store the execution result in the second private register, that is, a private register allocated to the microinstruction 10. In other words, a private register may be allocated to each microinstruction, and is configured to store an execution result of a microinstruction. FIG. 6 is a schematic diagram of an instruction processing process in an instruction processing method according to an embodiment of this application. In an example, the execution module 2034 may allocate a private register based on the PC value of the current instruction. For example, as shown in FIG. 6, PC values of microinstructions 2 to 9 sequentially increase, and the execution module 2034 allocates different private registers, for example, physical registers 0 to 7, to all microinstructions based on the PC values of the microinstructions. It may be understood that the computing chip may manage the eight physical registers by using identifiers TR1, TR2, TR3, TR4, TR5, TR6, TR7, and TR8. For example, the execution module 2034 allocates a private register TR1, namely, a physical register 0, to the microinstruction 2. Correspondingly, as shown in FIG. 5, a temporarily stored result 2 may be stored in a private register TR3, and a temporarily stored result 7 may be stored in a private register TR8.

Figure 7:
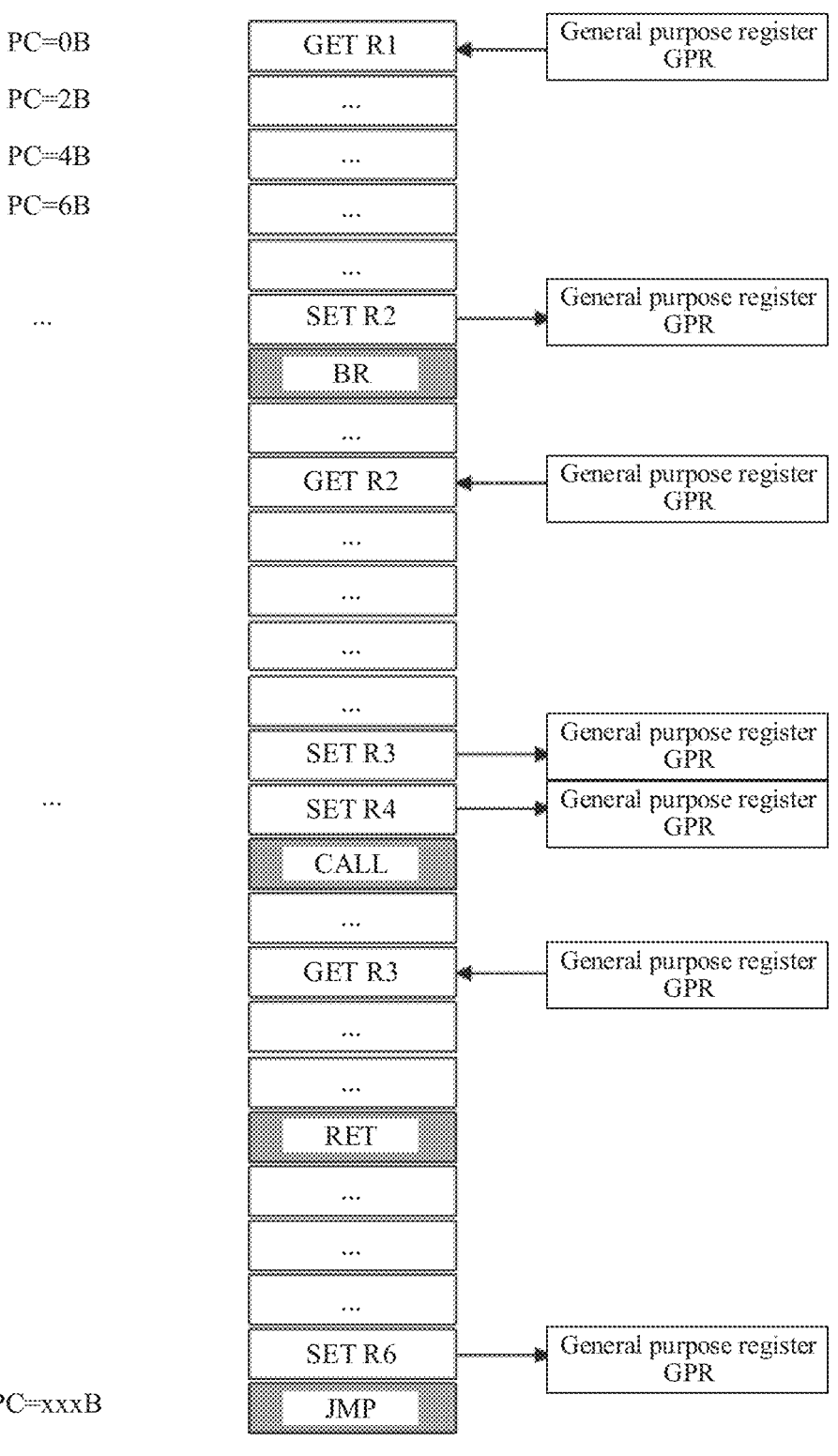
FIG. 7 is a schematic diagram of an instruction processing process in an instruction processing method according to an embodiment of this application.

For example, FIG. 7 is a schematic diagram of an instruction processing process in an instruction processing method according to an embodiment of this application. As shown in FIG. 7, the foregoing relative distance index is an index implemented based on consecutive PC values, for example, consecutive PC values corresponding to the continuously processed microinstructions in FIG. 7: PC=0B, PC=2B, PC=4B, and PC=6B. However, the jump instruction causes the execution module 2034 to switch an instruction processing procedure to a new instruction location in the computing task. Correspondingly, a PC value of the instruction starts to be counted from a PC value of the instruction at the new location after a jump. As a result, PC values before and after the jump instruction are no longer consecutive. In this way, content accessed by the execution module 2034 based on the relative distance index is determined based on the PC value of the instruction at the new location after the jump, and obtained content may not exist or may be inaccurate because the PC values are no longer consecutive.

In this embodiment of this application, when a jump instruction is encountered, the execution module 2034 no longer directly accesses the source operand in the private register based on the relative distance index, but stores, from the private register, a referenced execution result related to the jump instruction to a general purpose register, so that when the source operand is referenced, the source operand is imported from the general purpose register to the private register, thereby avoiding a problem of abnormal reference of the source operand in the relative distance index caused by inconsecutive PC values caused by the jump instruction. In addition, the execution module 2034 imports the source operand from the general purpose register to the private register, so that it can be ensured that the at least one microinstruction can be normally referenced based on the relative distance index, thereby implementing accurate and efficient instruction processing.

Specifically, still refer to FIG. 7. The general purpose register 201 (for example, a general purpose register GPR in FIG. 7) is configured to store an execution result that is of a first instruction and that is referenced by a second instruction, where the first instruction includes a microinstruction that is executed before a jump instruction in a plurality of microinstructions used to implement the computing task, that is, the foregoing microinstruction related to the jump instruction. For example, the first instruction may be a microinstruction before the jump instruction "BR" (a conditional jump instruction) shown in FIG. 7, and an execution result is referenced by a microinstruction executed after the jump instruction "BR", that is, the second instruction.

For example, the jump instruction may be, for example, five jump instructions shown in the following Table 2:

TABLE 2

Examples of jump instruction

| Jumping type | Explanation | Instruction example |
|---|---|---|
| Direct jump | Calculate a PC value based on an input value | JMP |
| Indirect jump | Index a related register based on an input value and calculate a PC value | Jmp*Operand |
| Condition-based jump | Set a PC value based on a size relationship of input values | BR |

TABLE 2-continued

Examples of jump instruction

| Jumping type | Explanation | Instruction example |
|---|---|---|
| Call jump | Save an address of a next instruction and set a PC value | CALL |
| Return jump | Return from a sub-procedure | RET |

Still refer to FIG. 7. When the parsing result includes a second register identifier, the execution module 2034 stores the source operand obtained from the first private register in the second general purpose register indicated by the second register identifier; or when the parsing result includes the first register identifier, the execution module 2034 stores the source operand obtained from the first general purpose register in an idle private register in a plurality of private registers. For example, the calculation task is shown in Table 3 below:

TABLE 3

Examples of calculation task

```
LOOP: ;          //Loop
GET R2;          //Import data in a general purpose register R2 to an idle private register,
for example, a private register TR0
LW [t#1, 0];     //Determine an array start address based on the data in the private register
TR0 and an offset 0, and store the array start address in the private register TR1. A relative
distance index t#1, that is, the distance is 1, indicates a register used to store an execution
result of the instruction "GET R2" before the instruction "LW [t#1, 0]": the private register
TR0. A relative distance index in a subsequent instruction is similar to t#1, and a difference
lies in that distances are different. For a same part, refer to an explanation of t#1 and
descriptions of the relative distance index in the embodiments in FIG. 4 and FIG. 5 of this
application. Details are not described subsequently again.
LD [t#2, 8];     //Determine a subscript of a double-word type of an array element based
on an offset 8 and the array start address in the private register TR1, and store the subscript
to a private register TR2
SET R2, t#1;     //Store data in the private register TR2 to the general purpose register R2
GET R2;          //Obtain data in the general purpose register R2 and store the data in an
idle private register TR3
ADD t#4, t#1;    //Add data in the private register TR3 to data in the private register TR1,
and store a result in a private register TR4
SLLI t#1, 32;    //Shift a value of data in the private register TR4 leftwards by 32 bits, and
store a result in a private register TR5
SRAI t#1, 32;    //Shift a value of data in the private register TR5 rightwards by 32 bits,
fill empty bits obtained through right-shifting with sign bits of the data, and store a result in
a private register TR6
SET R3, t#1;     //Store data in the private register TR6 to a general purpose register R3
CONST #100;      //A constant 100 is stored in the private register TR6
CMP.NE t#8, t#1; //Subtract the constant 100 in the private register TR6 from an element in
the array indicated by the private register TR2, that is, compare the element in the array with
100 to obtain a comparison result
BR.I t#1, LOOP;  //If an execution result, namely, the comparison result, of the
microinstruction CMP.NE meets a condition, execute a loop of this code segment
```

With reference to Table 3, it can be learned that, in this embodiment of this application, a source operand can be directly referenced based on a relative distance index between instructions. In this way, there is no need to specially name a register for output. This not only reduces encoding difficulty and reduces a quantity of bits occupied by instruction encoding, but also avoids a decrease in processing efficiency caused by register renaming. In addition, when a jump instruction is encountered, the execution module 2034 in this embodiment of this application may store data in a private register (for example, the private register TR2 in Table 3) to a general purpose register GPR (for example, the general purpose register R2 in Table 3), for example, through a storage instruction SET. When a new PC value is obtained, that is, a jump instruction is executed, after the BR instruction shown in FIG. 7, the execution module 2034 imports the value of the general purpose register GPR to an idle private register (for example, the private register TR3 in Table 3), for example, through a GET instruction, to ensure that the instruction after the jump instruction uses content used before the jump instruction again. For example, the microinstruction "ADD t#4, t#1" in Table 3 references the data in the private register TR3 by using the relative distance index t#1. An involved data stream may be, for example, data set_data in FIG. 2, a general purpose register identifier gpr_id, and an instruction get/set. In this way, a relative distance change caused by the jump instruction can be handled, thereby ensuring accurate instruction processing.

In an optional implementation, after determining the execution result of the any microinstruction, the instruction processing unit may further submit the any microinstruction, so that the computing chip executes the computing task based on the execution result of the any microinstruction.

Before the execution result of the any microinstruction is stored in a register:

if a preset quantity of microinstructions before the any microinstruction are all submitted, the instruction processing unit updates, to an idle state, a private register occupied by a microinstruction that is in the preset quantity of microinstructions and that has a longest relative distance from the any microinstruction; or if the any microinstruction is a jump instruction, the instruction processing unit updates, to an idle state, a private register occupied by each microinstruction in a preset quantity of microinstructions before the jump instruction, where the preset quantity is an integer greater than or equal to 1.

The instruction processing unit is specifically configured to store the execution result of the any microinstruction in an idle register based on the parsing result.

For example, in the computing chip of the superscalar architecture, when the execution module 2034 in the instruction processing unit completes execution of the current microinstruction and obtains the execution result, the execution module 2034 may submit the microinstruction, so that the computing chip executes a computing task based on the execution result of the any microinstruction. For example, the instruction is marked as a completed state, and when execution of an instruction before the instruction in a serial sequence of programs is completed, an execution result of the instruction is used to update an internal state of the processor (for example, write back: update content corresponding to the instruction in a main memory of the processor by using the execution result of the instruction). In this case, it is referred to as that the instruction retires, that is, the instruction may be removed from an instruction processing pipeline.

On this basis, a quantity of registers of the computing chip, that is, physical registers, is usually limited. As shown in FIG. 6, the computing chip has eight physical registers, and the preset quantity may be 8. A current instruction processed by the execution module 2034 is a microinstruction 10. When eight microinstructions before the microinstruction 10, that is, microinstructions 2 to 9, are all submitted, a private register, namely, a physical register 0, occupied by a microinstruction 2, that is, the oldest microinstruction, in the eight microinstructions, is updated to an idle state, that is, the private register is released. For example, as shown in FIG. 2, in this case, processing of the microinstruction 10 by the execution module 2034 may be suspended, that is, stalled.

It may be understood that, in this embodiment of this application, a reference distance of a microinstruction is less than or equal to 8. In this way, submission of all microinstructions 2 to 9 indicates that no microinstruction references an execution result of the microinstruction 2. Releasing a private register corresponding to the microinstruction 2 can ensure that no exception occurs in instruction processing and effective use of the private register is considered.

Alternatively, if the current microinstruction is a jump instruction, a private register occupied by each microinstruction in a preset quantity of microinstructions before the jump instruction are updated to an idle state. When the jump instruction is executed, the execution result of the microinstruction before the jump instruction is stored in a general purpose register, and does not need to be obtained from the private register. Based on this, a private register occupied by each microinstruction in the preset quantity of microinstructions before the jump instruction can be released.

In an example, a manner of releasing the private register may be marking a to-be-released private register as an idle state. The execution module 2034 may allocate the private register in the idle state to a microinstruction that needs to use a private register, for example, allocate the private register to the microinstruction 10, and write an execution result of the microinstruction 10 into the private register. The preset quantity is an integer greater than or equal to 1.

Still refer to FIG. 6. The foregoing release of the private register is equivalent to determining, based on moving of an execution window that may include a preset quantity of microinstructions (for example, a window of 8 instructions) in an instruction processing process, a private register that can be released, to ensure that a current instruction always has a corresponding private register that can be used in the instruction processing process. For example, when the execution module 2034 obtains the execution result of the microinstruction 10, before the execution result is stored in the register, if the private register corresponding to the microinstruction 2 is released, the execution window may move: the execution window moves to the microinstruction 10. In this way, a new execution window includes microinstructions 3 to 10, and the execution result of the microinstruction 10 is stored in the physical register 0. In this way, in this embodiment of this application, an effect of an infinite quantity of private registers can be achieved by managing release of a register based on submission of a microinstruction, thereby further improving instruction processing efficiency and reducing hardware costs of the computing chip. Similarly, as shown in FIG. 5, the execution module 2034 releases the private register in the execution window moving manner. For a released private register, a temporarily stored result therein is overwritten by a currently written execution result.

In addition, the computing chip may write the execution result to the general purpose register when the general purpose register is in the idle state.

In an optional example, the preset quantity may be equal to a quantity of the plurality of private registers.

For example, still refer to FIG. 6. If the computing chip, for example, the processor, has 16 physical registers (for example, the physical register 0 to a physical register 15), an execution window including 16 microinstructions, that is, a window of 16 instructions, may be constructed.

In addition, in this embodiment of this application, elimination of a main hotspot and a key path (for example, an output of an instruction and a storage location of source data referenced by the instruction) from a front-end pipeline facilitates extension of instruction-level parallel processing, and an instruction window can be adaptively extended based on the quantity of registers. Therefore, this facilitates extension of an instruction-level parallel processing capability.

In an optional implementation, the instruction processing unit may obtain any microinstruction in the plurality of microinstructions through prediction according to an out-of-order processing rule of the superscalar processor architecture, and perform the parsing any microinstruction in the plurality of microinstructions; and when a the prediction is incorrect, update a register occupied by the any microinstruction that is incorrectly predicted to an idle state, and re-perform the obtaining any microinstruction in the plurality of microinstructions through prediction.

For example, in the computing chip of the superscalar architecture, if an instruction is incorrectly predicted, a register occupied by the incorrectly predicted instruction is cleared, that is, refreshed (flush shown in FIG. 2). A conventional superscalar processor needs to spend several cycles to restore a mapping relationship between a register and an instruction to a state before a prediction error occurs, and restore a release list that records a register state. However, in this embodiment of this application, it only needs to re-predict a microinstruction and update a register occupied by any incorrectly predicted microinstruction to an idle state, that is, clear the register, thereby greatly simplifying an implementation logic of out-of-order instruction execution, and further improving processing efficiency.

In this embodiment of this application, if an instruction prediction is incorrect, only a private register needs to be refreshed, and a mapping relationship does not need to be searched for to restore the register to a state before a predicted instruction is used. Hardware with lower complexity is used to implement a simpler out-of-order execution pipeline, and a restoration speed of instruction processing when a prediction misses is accelerated.

In an optional implementation, the instruction processing unit may specifically create at least one thread used to execute the computing task, and allocate at least two private registers in the plurality of private registers to each thread in the at least one thread, where each thread is configured to process at least one microinstruction in the plurality of microinstructions; and perform the parsing any microinstruction in the plurality of microinstructions on the any microinstruction in the at least one microinstruction through each thread.

Figure 8:
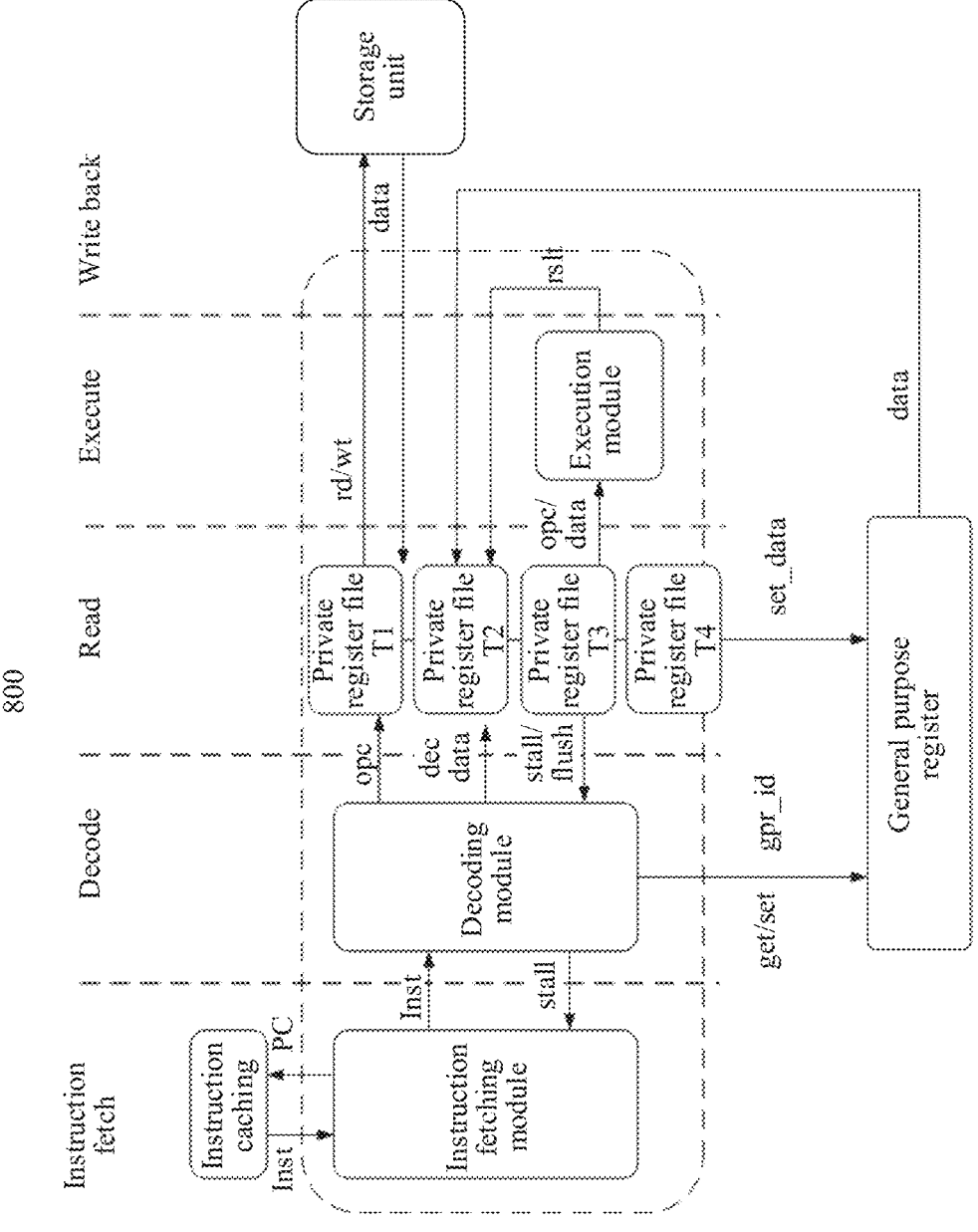
FIG. 8 is a block diagram of a structure of a computing chip 800 according to an embodiment of this application.

For example, FIG. 8 is a block diagram of a structure of a computing chip 800 according to an embodiment of this application. As shown in FIG. 8, the computing chip 800 is similar to the computing chip 200 shown in FIG. 2, and a same part is not described herein again. For details, refer to the descriptions of the embodiment in FIG. 2. A difference lies in that there are a plurality of private register files in the computing chip 800. Based on this, the instruction processing unit may specifically create at least one thread used to execute the computing task, and allocate at least two private registers in the plurality of private registers to each thread in the at least one thread. In this way, the computing chip 800 can perform multi-thread processing on the instruction. A component, for example, a private register, used by each thread needs to be additionally added. A common part, for example, a computing unit and a decoding module, may be shared.

Figure 9A:
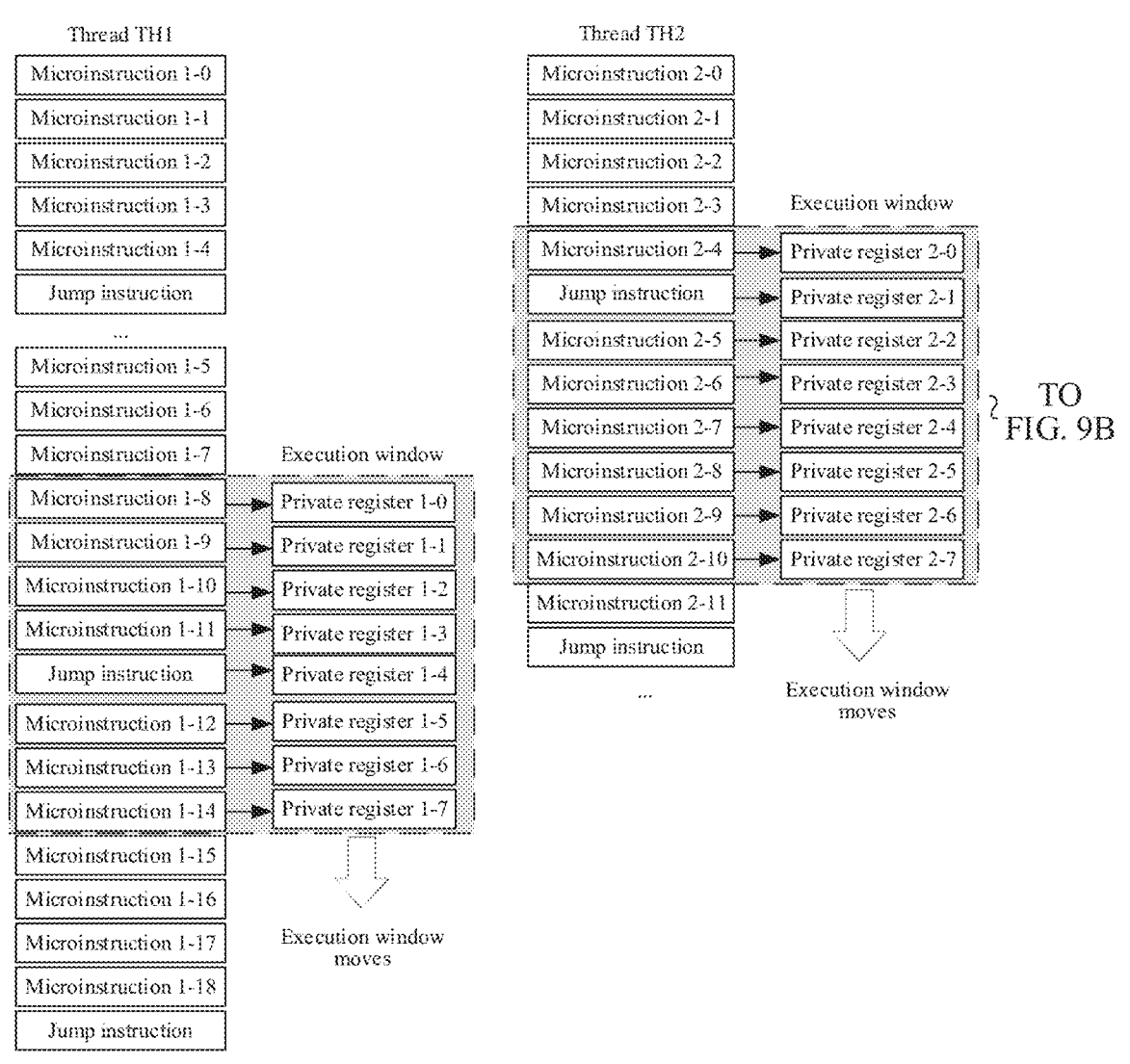
FIG. 9A and FIG. 9B are a schematic diagram of an instruction processing process in an instruction processing method according to an embodiment of this application.
Figure 9B:
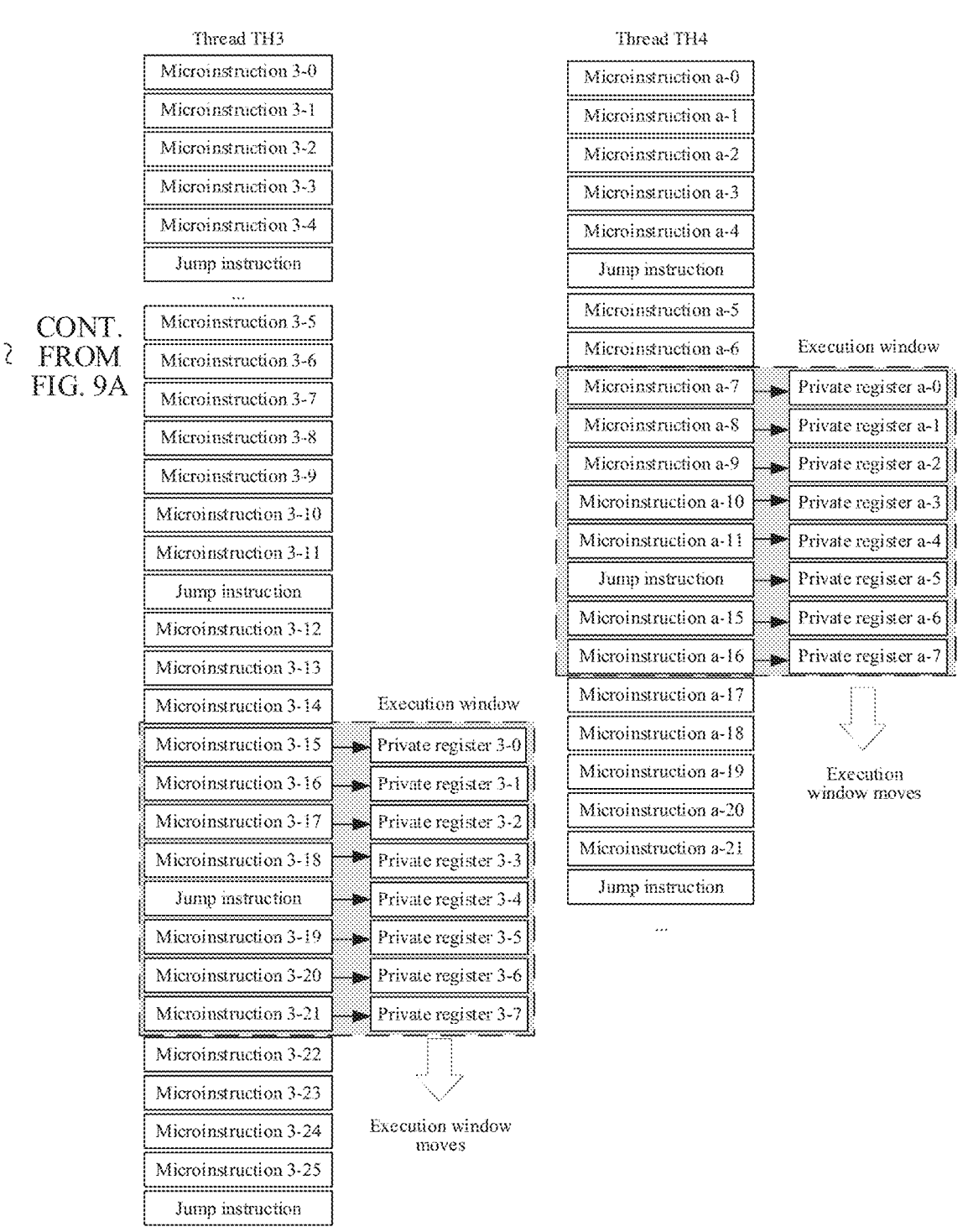

For example, FIG. 9A and FIG. 9B are a schematic diagram of an instruction processing process in an instruction processing method according to an embodiment of this application. As shown in FIG. 9A and FIG. 9B, the computing chip in FIG. 8 may create a plurality of threads to process the computing task, and each thread processes one microinstruction sequence of the computing task. For example, a thread TH1 processes an instruction sequence starting from a microinstruction 1-0. Each thread may process a microinstruction in the same way, and each thread is allocated with a plurality of private registers. For example, the instruction processing unit allocates a total of 32 private registers to the thread TH1 to a thread TH4. In an example, eight private registers may be allocated to each thread. For example, a private register 1-0 to a private register 1-7 are allocated to the thread TH1, and a private register 2-0 to a private register 2-7 are allocated to a thread TH2. In this embodiment of this application, when there are a plurality of threads, allocation of private registers is not specifically limited, and may be set based on an application requirement.

In this embodiment of this application, the computing chip may create at least one thread and allocate a plurality of private registers to each thread, to implement multi-thread instruction processing, and further improve instruction processing efficiency.

It should be understood that the processor shown in FIG. 2 and FIG. 8 is merely an example of the processor, and the processor may have more or fewer components than those shown in the figure, may combine two or more components, or may have different component configurations. Various components shown in FIG. 2 and FIG. 8 may be implemented in software, hardware, or a combination of hardware and software, that includes one or more signal processing and/or application-specific integrated circuits.

In addition, to implement functions of the processor in the foregoing embodiments of this application, the processor shown in FIG. 2 and FIG. 8 in this application includes corresponding hardware and/or software modules for performing the functions. With reference to the steps of the examples described in the embodiments disclosed in this specification, this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

According to an embodiment, a computer storage medium is further provided. The computer storage medium stores computer instructions. When the computer instructions are run on an electronic device, the electronic device is enabled to perform the related steps of the method, to implement the data processing method in the foregoing embodiments.

According to an embodiment, a computer program product is further provided. When the computer program product runs on a computer, the computer is enabled to perform the foregoing related steps, to implement the data processing method in the foregoing embodiments.

The electronic device, the computer storage medium, the computer program product, or the chip provided in the embodiments may be configured to execute the corresponding method provided above. Therefore, for beneficial effects that can be achieved, refer to the beneficial effects of the corresponding method provided above. Details are not described herein again.

Any content of embodiments of this application and any content of a same embodiment may be freely combined. Any combination of the foregoing content falls within the scope of this application.

A person skilled in the art should be aware that in the foregoing one or more examples, functions described in embodiments of this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general purpose or dedicated computer.

The foregoing describes embodiments of this application with reference to the accompanying drawings. However, this application is not limited to the foregoing specific implementations. The foregoing specific implementations are merely examples, but are not limitative. Inspired by this application, a person of ordinary skill in the art may further make modifications without departing from the purposes of this application and the protection scope of the claims, and all the modifications shall fall within the protection of this application.

What is claimed is:

1. A computing chip, wherein the computing chip uses a superscalar processor architecture and comprises a plurality of registers and an instruction processing unit, the plurality of registers are separately coupled to the instruction processing unit, and the plurality of registers comprise a general purpose register and a plurality of private registers that are separately coupled to the general purpose register;

the general purpose register is configured to store an execution result that is of a before-jump instruction and that is referenced by an after-jump instruction, wherein the before-jump instruction comprises a microinstruction that is executed before a jump instruction in a plurality of microinstructions used to implement a computing task, and the after-jump instruction comprises a microinstruction that is executed after the jump instruction;

each private register in the plurality of private registers is configured to store an execution result of a microinstruction other than a storage instruction in the plurality of microinstructions; and the instruction processing unit is configured to:

parse a first microinstruction in the plurality of microinstructions;

obtain a source operand in a first register in the plurality of registers based on a parsing result to determine an execution result of the first microinstruction;

when the first microinstruction is the jump instruction, update, to an idle state, a private register occupied by each microinstruction in a preset quantity of microinstructions before the jump instruction, wherein the preset quantity comprises an integer greater than or equal to 1;

store the execution result of the first microinstruction in a second register that is in the plurality of registers and that is different from the first register; and parse the plurality of microinstructions until the computing task is completed, wherein:

the source operand comprises an execution result of a second microinstruction referenced by the first microinstruction, and, when the source operand comprises an execution result in the private register, the parsing result comprises a relative distance index indicating a relative distance between the first microinstruction and the second microinstruction.

2. The computing chip according to claim 1, wherein the instruction processing unit is configured to:

obtain one microinstruction in the plurality of microinstructions, and parse the one microinstruction, to obtain a parsing result, wherein the parsing result comprises a location obtaining identifier or the relative distance index and a second register identifier, and the location obtaining identifier comprises a first register identifier or the relative distance index;

obtain the source operand from a first private register indicated by the relative distance index or a first general purpose register indicated by the first register identifier;

execute the first microinstruction based on the source operand obtained from the first private register, to obtain the execution result of the first microinstruction, and store the execution result of the first microinstruction in a second private register that is in the plurality of private registers and that is allocated to the first microinstruction;

when the parsing result comprises the second register identifier, store the source operand obtained from the first private register in a second general purpose register indicated by the second register identifier;

store the source operand obtained from the first general purpose register in an idle private register in the plurality of private registers; and perform the obtaining one microinstruction in the plurality of microinstructions until the computing task is completed.

3. The computing chip according to claim 1, wherein the instruction processing unit is further configured to:

after the determining an execution result of the first microinstruction, submit the first microinstruction, so that the computing chip executes the computing task based on the execution result of the first microinstruction; and before the storing the execution result of the first microinstruction in a register:

when a preset quantity of microinstructions before the first microinstruction are all submitted, update, to an idle state, a private register occupied by a microinstruction that is in the preset quantity of microinstructions and that has a longest relative distance from the first microinstruction; and the instruction processing unit is configured to:

store the execution result of the first microinstruction in an idle register based on the parsing result.

4. The computing chip according to claim 3, wherein the preset quantity is equal to a quantity of the plurality of private registers.

5. The computing chip according to claim 1, wherein the instruction processing unit is configured to:

create at least one thread used to execute the computing task, and allocate at least two private registers in the plurality of private registers to each thread in the at least one thread, wherein each thread is configured to process at least one microinstruction in the plurality of microinstructions; and perform the parsing the first microinstruction in the plurality of microinstructions on any microinstruction in the at least one microinstruction through each thread.

6. The computing chip according to claim 1, wherein the instruction processing unit is configured to:

obtain the first microinstruction in the plurality of microinstructions through prediction according to an out-of-order processing rule of the superscalar processor architecture, and perform the parsing the first microinstruction in the plurality of microinstructions to obtain a parsing result; and when the prediction is incorrect, update a register occupied by the first microinstruction that is incorrectly predicted to an idle state, and re-perform the obtaining the first microinstruction in the plurality of microinstructions through prediction.

7. The computing chip according to claim 1, wherein the instruction processing unit comprises an instruction caching module, an instruction fetching module coupled to the instruction caching module, a decoding module coupled to the instruction fetching module, and an execution module separately coupled to the plurality of private registers, wherein the decoding module is separately coupled to the plurality of private registers;

the instruction caching module is configured to store the plurality of microinstructions;

the instruction fetching module is configured to:

obtain one microinstruction in the instruction caching module to obtain the first microinstruction in the plurality of microinstructions; and transfer the first microinstruction in the plurality of microinstructions to the decoding module until the computing task is completed;

the decoding module is configured to:

parse the first microinstruction in the plurality of microinstructions;

obtain the source operand in the first register in the plurality of registers based on the parsing result; and send the source operand and the parsing result to the execution module; and the execution module is configured to:

determine, based on the source operand and the parsing result, the execution result of the first microinstruction; and store the execution result of the first microinstruction in the second register that is in the plurality of registers and that is different from the first register.

8. An instruction processing method, applied to a computing chip that uses a superscalar processor architecture, wherein the computing chip comprises a plurality of registers, and the plurality of registers comprise a general purpose register and a plurality of private registers, wherein the method comprises:

obtaining a plurality of microinstructions used to implement a computing task;

parsing a first microinstruction in the plurality of microinstructions to obtain a parsing result;

obtaining a source operand in a first register in the plurality of registers based on the parsing result, wherein the source operand comprises an execution result of a second microinstruction referenced by the first microinstruction, and, when the first register comprises the private register, the parsing result comprises a relative distance index indicating a relative distance between the first microinstruction and the second microinstruction;

determining, based on the parsing result and the source operand, an execution result of the first microinstruction;

when the first microinstruction is a jump instruction, updating, to an idle state, a private register occupied by each microinstruction in a preset quantity of microinstructions before the jump instruction, wherein the preset quantity comprises an integer greater than or equal to 1; and storing the execution result of the first microinstruction in a second register that is in the plurality of registers and that is different from the first register, and performing the parsing the first microinstruction in the plurality of microinstructions to obtain a parsing result until the computing task is completed, wherein:

when the first microinstruction comprises a before-jump instruction, the second register comprises the general purpose register, the before-jump instruction comprises a microinstruction that is in the plurality of microinstructions and that is executed before the jump instruction and whose execution result is referenced by an after-jump instruction, and the after-jump instruction comprises a microinstruction that is executed after the jump instruction; or when the first microinstruction comprises a microinstruction other than a storage instruction in the plurality of microinstructions, the second register comprises any private register in the plurality of private registers.

9. The method according to claim 8, wherein the parsing the first microinstruction in the plurality of microinstructions to obtain a parsing result comprises:

obtaining one microinstruction in the plurality of microinstructions, and parsing the one microinstruction to obtain a parsing result, wherein the parsing result comprises a location obtaining identifier or a relative distance index and a second register identifier, and the location obtaining identifier comprises a first register identifier or the relative distance index;

the obtaining a source operand in a first register in the plurality of registers based on the parsing result comprises:

obtaining the source operand from a first private register indicated by the relative distance index or a first general purpose register indicated by the first register identifier; and the determining, based on the parsing result and the source operand, an execution result of the first microinstruction, storing the execution result of the first microinstruction in a second register that is in the plurality of registers and that is different from the first register, and performing the parsing the first microinstruction in the plurality of microinstructions to obtain a parsing result until the computing task is completed comprises:

executing the first microinstruction based on the source operand obtained from the first private register, to obtain the execution result of the first microinstruction, and storing the execution result of the first microinstruction in a second private register that is in the plurality of private registers and that is allocated to the first microinstruction;

when the parsing result comprises the second register identifier, storing the source operand obtained from the first private register in a second general purpose register indicated by the second register identifier;

storing the source operand obtained from the first general purpose register in an idle private register in the plurality of private registers; and performing the obtaining one microinstruction in the plurality of microinstructions until the computing task is completed.

10. The method according to claim 8, wherein after the determining an execution result of the first microinstruction, the method further comprises:

submitting the first microinstruction for the method to execute the computing task based on the execution result of the first microinstruction;

before the storing the execution result of the first microinstruction in a register, the method further comprises:

when a preset quantity of microinstructions before the first microinstruction are all submitted, updating, to an idle state, a private register occupied by a microinstruction that is in the preset quantity of microinstructions and that has a longest relative distance from the first microinstruction; and the storing the execution result of the first microinstruction in a second register that is in the plurality of registers and that is different from the first register comprises:

storing the execution result of the first microinstruction in an idle register based on the parsing result.

11. The method of claim 10, wherein the preset quantity is equal to a quantity of plurality of private registers.

12. The method according to claim 8, wherein the parsing the first microinstruction in the plurality of microinstructions to obtain a parsing result comprises:

creating at least one thread used to execute the computing task, and allocating at least two private registers in the plurality of private registers to each thread in the at least one thread, wherein each thread is configured to process at least one microinstruction in the plurality of microinstructions; and performing the parsing the first microinstruction in the plurality of microinstructions on any microinstruction in the at least one microinstruction through each thread.

13. The method according to claim 8, wherein the parsing the first microinstruction in the plurality of microinstructions to obtain a parsing result comprises:

obtaining the first microinstruction in the plurality of microinstructions through prediction according to an out-of-order processing rule of the superscalar processor architecture, and performing the parsing the first microinstruction in the plurality of microinstructions to obtain a parsing result; and when the prediction is incorrect, updating a register occupied by the first microinstruction that is incorrectly predicted to an idle state, and re-performing the obtaining the first microinstruction in the plurality of microinstructions through prediction.

14. An electronic device, comprising:

a computing chip, wherein the computing chip has a superscalar processor architecture and comprises a plurality of registers and an instruction processing unit, the plurality of registers are separately coupled to the instruction processing unit, and the plurality of registers comprise a general purpose register and a plurality of private registers that are separately coupled to the general purpose register;

at least one processor; and a memory, configured to store one or more programs, wherein:

when the one or more programs are executed by the at least one processor, the at least one processor is enabled to implement an instruction processing method comprising:

obtaining a plurality of microinstructions used to implement a computing task;

parsing a first microinstruction in the plurality of microinstructions to obtain a parsing result;

obtaining a source operand in a first register in the plurality of registers based on the parsing result, wherein the source operand comprises an execution result of a second microinstruction referenced by the first microinstruction, and, when the first register comprises the private register, the parsing result comprises a relative distance index indicating a relative distance between the first microinstruction and the second microinstruction;

determining, based on the parsing result and the source operand, an execution result of the first microinstruction;

when the first microinstruction is a jump instruction, updating, to an idle state, a private register occupied by each microinstruction in a preset quantity of microinstructions before the jump instruction, wherein the preset quantity comprises an integer greater than or equal to 1; and storing the execution result of the first microinstruction in a second register that is in the plurality of registers and that is different from the first register, and performing the parsing the first microinstruction in the plurality of microinstructions to obtain a parsing result until the computing task is completed, wherein:

when the first microinstruction comprises a before-jump instruction, the second register comprises the general purpose register, the before-jump instruction comprises a microinstruction that is in the plurality of microinstructions and that is executed before the jump instruction and whose execution result is referenced by an after-jump instruction, and the after-jump instruction comprises a microinstruction that is executed after the jump instruction; or when the first microinstruction comprises a microinstruction other than a storage instruction in the plurality of microinstructions, the second register comprises any private register in the plurality of private registers.

15. The electronic device of claim 14, wherein the parsing the first microinstruction in the plurality of microinstructions to obtain a parsing result comprises:

obtaining one microinstruction in the plurality of microinstructions, and parsing the one microinstruction to obtain a parsing result, wherein the parsing result comprises a location obtaining identifier or a relative distance index and a second register identifier, and the location obtaining identifier comprises a first register identifier or the relative distance index;

the obtaining a source operand in a first register in the plurality of registers based on the parsing result comprises:

obtaining the source operand from a first private register indicated by the relative distance index or a first general purpose register indicated by the first register identifier; and the determining, based on the parsing result and the source operand, an execution result of the first microinstruction, storing the execution result of the first microinstruction in a second register that is in the plurality of registers and that is different from the first register, and performing the parsing the first microinstruction in the plurality of microinstructions to obtain a parsing result until the computing task is completed comprises:

executing the first microinstruction based on the source operand obtained from the first private register, to obtain the execution result of the first microinstruction, and storing the execution result of the first microinstruction in a second private register that is in the plurality of private registers and that is allocated to the first microinstruction;

when the parsing result comprises the second register identifier, storing the source operand obtained from the first private register in a second general purpose register indicated by the second register identifier;

storing the source operand obtained from the first general purpose register in an idle private register in the plurality of private registers; and performing the obtaining one microinstruction in the plurality of microinstructions until the computing task is completed.

16. The electronic device of claim 14, wherein after the determining an execution result of the first microinstruction, the method further comprises:

submitting the first microinstruction for the method to execute the computing task based on the execution result of the first microinstruction;

before the storing the execution result of the first microinstruction in a register, the method further comprises:

when a preset quantity of microinstructions before the first microinstruction are all submitted, updating, to an idle state, a private register occupied by a microinstruction that is in the preset quantity of microinstructions and that has a longest relative distance from the first microinstruction; and the storing the execution result of the first microinstruction in a second register that is in the plurality of registers and that is different from the first register comprises:

storing the execution result of the first microinstruction in an idle register based on the parsing result.

17. The electronic device of claim 16, wherein the preset quantity is equal to a quantity of plurality of private registers.

18. The electronic device of claim 14, wherein the parsing the first microinstruction in the plurality of microinstructions to obtain a parsing result comprises:

creating at least one thread used to execute the computing task, and allocating at least two private registers in the plurality of private registers to each thread in the at least one thread, wherein each thread is configured to process at least one microinstruction in the plurality of microinstructions; and performing the parsing the first microinstruction in the plurality of microinstructions on any microinstruction in the at least one microinstruction through each thread.

19. The electronic device of claim 14, wherein the parsing the first microinstruction in the plurality of microinstructions to obtain a parsing result comprises:

obtaining the first microinstruction in the plurality of microinstructions through prediction according to an out-of-order processing rule of the superscalar processor architecture, and performing the parsing the first microinstruction in the plurality of microinstructions to obtain a parsing result; and when the prediction is incorrect, updating a register occupied by the first microinstruction that is incorrectly predicted to an idle state, and re-performing the obtaining the first microinstruction in the plurality of microinstructions through prediction.

\* \* \* \* \*